United States Patent [19]

Dev et al.

[11] Patent Number: 6,049,828
[45] Date of Patent: *Apr. 11, 2000

[54] METHOD AND APPARATUS FOR MONITORING THE STATUS OF NON-POLLABLE DEVICES IN A COMPUTER NETWORK

[75] Inventors: Roger H. Dev, Durham; Mark H. Nelson, Fremont, both of N.H.

[73] Assignee: Cabletron Systems, Inc., Rochester, N.H.

[*] Notice: This patent is subject to a terminal disclaimer.

[21] Appl. No.: 09/153,711

[22] Filed: Sep. 15, 1998

Related U.S. Application Data

[63] Continuation of application No. 08/824,492, Mar. 27, 1997, Pat. No. 5,812,750, which is a continuation of application No. 08/623,281, Mar. 28, 1996, abandoned, which is a continuation of application No. 08/355,430, Dec. 13, 1994, Pat. No. 5,559,955, which is a continuation of application No. 08/216,696, Mar. 23, 1994, abandoned, which is a continuation of application No. 07/797,121, Nov. 22, 1991, abandoned, which is a continuation-in-part of application No. 07/583,509, Sep. 17, 1990, abandoned.

[51] Int. Cl.$^7$ ..................................................... G06F 7/38
[52] U.S. Cl. ......................... 709/224; 709/220; 709/223; 709/226; 709/239; 714/11; 714/43; 714/56
[58] Field of Search .............................. 345/969; 709/220, 709/223, 224, 225, 226, 229, 249, 253, 239; 714/11, 43, 56

[56] References Cited

U.S. PATENT DOCUMENTS

| | | | |
|---|---|---|---|
| 4,251,858 | 2/1981 | Cambigue et al. | 395/200 X |
| 4,545,011 | 10/1985 | Lyon et al. | 364/200 |

(List continued on next page.)

FOREIGN PATENT DOCUMENTS 0 347 360 12/1989 European Pat. Off. .
WO 80/01615 8/1980 WIPO .

OTHER PUBLICATIONS

Allwood et al., "Diagnosing Faults In A Telecommunications Network By An Expert System," IEEE Proceedings I. Solid–State & Electronic Devices, vol. 137, No. 5, Oct. 1, 1990, pp. 273–280.

T.E.Marques, "A Sympton–Driven Expert System For Isolating And Correcting Network Faults," IEEE Communications Magazine, vol. 26, No. 3, Mar. 1988, pp. 6–13.

J.R. Agre, "A Message–Based Fault Diagnosis Procedure," ACM SIGCOMM '86 Symposium On Communications Architectures And Protocols, Stowe, Vermont USA, Aug. 5–7, 1986, vol. 16, No. 3, ISSN 0146–4833, Computer Communication Review, Aug. 1986, USA, pp. 328–337.

(List continued on next page.)

*Primary Examiner*—John A. Follensbee
*Assistant Examiner*—Dzung C Nguyen
*Attorney, Agent, or Firm*—Wolf, Freenfield & Sacks, P.C.

[57] ABSTRACT

A network management system includes a user interface, a virtual network and a device communication manager. The virtual network includes models which represent network entities and model relations which represent relations between network entities. Each model includes network data relating to a corresponding network entity and one or more inference handlers for processing the network data to provide user information. The system can poll or communicate with certain network entities and can infer the status of network connectors and other network entities for which polling is impossible or impractical. The system performs a fault isolation technique wherein the fault status of a network device is suppressed when it is determined that the device is not defective. User displays include hierarchical location views and topological views of the network configuration. Network devices are represented on the displays by multifunction icons which permit the user to select additional displays showing detailed information regarding different aspects of the corresponding network device.

10 Claims, 14 Drawing Sheets

U.S. PATENT DOCUMENTS

| | | | |
|---|---|---|---|
| 4,695,946 | 9/1987 | Andreasen et al. | 395/575 |
| 4,701,845 | 10/1987 | Andreasen et al. | 395/575 |
| 4,827,411 | 5/1989 | Arrowood et al. | 364/300 |
| 4,833,592 | 5/1989 | Yamanaka | 364/188 X |
| 4,858,152 | 8/1989 | Estes | 364/550 |
| 4,896,319 | 1/1990 | Lidinsky et al. | 370/60 |
| 4,956,835 | 9/1990 | Grover | 370/16 |
| 5,008,853 | 4/1991 | Bly et al. | 364/900 |
| 5,036,334 | 7/1991 | Henderson et al. | 342/460 |
| 5,038,318 | 8/1991 | Roseman | 395/375 |
| 5,049,873 | 9/1991 | Robins et al. | 340/825.06 |
| 5,133,063 | 7/1992 | Naito et al. | 395/500 |
| 5,138,712 | 8/1992 | Corbin | 395/700 |
| 5,226,120 | 7/1993 | Brown | 395/200 |
| 5,276,789 | 1/1994 | Besaw et al. | 395/140 |
| 5,559,955 | 9/1996 | Dev et al. | 395/182.02 |
| 5,606,664 | 2/1997 | Brown et al. | 709/1 |
| 5,802,286 | 9/1998 | Dere et al. | 709/5 |

OTHER PUBLICATIONS

R.S.Gilbert et al., "CNMGraf—Graphic Presentation Services For Network Management," Proceedings of the Ninth Data Communications Symposium (Cat. No. 85CH2137–8), Whistler Mountain, BC, Canada, Sep. 10–13, 1985, ISBN 0–89791–164–4, 1985, Washington DC, USA, IEEE Comput. Soc. Press, USA, pp. 199–206.

D.Bursky,"Simulator Eases Communication Network With Integrated Graphics, A Simulator Helps Designer Create Network Models To Analyze Throughput," Electronic Design, vol. 37, No. 21, Oct. 12, 1989, pp. 97/98.

Andrew S. Tanenbaum "Structured Computer Organization," Prentice–Hall (1984) pp. 10–12.

Cantone, R. et al., "Model–Based Probabilistic Reasoning For Electronics Troubleshooting," Proc. 8th International Joint Conference on AI, Aug. 8–12, 1983, pp. 207–211.

Hseush, W. et al., "A Network Architecture for Reliable Distributed Computing", Proc. 1987, Symp. on Simulation of Computer Netwoks, pp. 11–12.

Jones, E., et al., "Monitoring and Analysis Strategies For Digital Networks," IEEE J. on Selected Areas in Comm., vol. 6, No. 4, May 1988, pp. 715–721.

Sutter, M. et al., "Designing Expert Systems for Real–Time Diagnosis of Self–Correcting Networks," IEEE Network Magazine, Sep. 1988, pp. 43–51.

Gargano et al., "A Logical Data Model On Integrated Geographical Database," IEEE 0/1990, pp. 473–481.

METHOD AND APPARATUS FOR MONITORING THE STATUS OF NON-POLLABLE DEVICES IN A COMPUTER NETWORK

CROSS REFERENCE TO RELATED APPLICATION

This application is a continuation of application Ser. No. 08/824,492 filed Mar. 27, 1997 (now U.S. Pat. No. 5,812, 750) entitled METHOD AND APPARATUS FOR MONITORING THE STATUS OF NON-POLLABLE DEVICES IN A COMPUTER NETWORK, which is a continuation of U.S. Ser. No. 08/623,281 filed Mar. 28, 1996 (abandoned), which is a continuation of U.S. Ser. No. 08/355,430 filed Dec. 13, 1994 (now U.S. Pat. No. 5,559,955), which is a continuation of U.S. Ser. No. 08/216,696 filed Mar. 23, 1994 (abandoned), which is a continuation of U.S. Ser. No. 07/797,121 filed Nov. 22, 1991 (abandoned), which is a continuation-in-part of U.S. Ser. No. 07/583,509 filed Sep. 17, 1990 (abandoned).

FIELD OF THE INVENTION

This invention relates to systems for management of computer networks and, more particularly, to methods and apparatus for monitoring the status of a network entity without communicating with the network entity.

BACKGROUND OF THE INVENTION

Computer networks are widely used to provide increased computing power, sharing of resources and communication between users. Computer systems and computer system components are interconnected to form a network. Networks may include a number of computer devices within a room, building or site that are interconnected by a high speed local data link such as local area network (LAN), token ring, Ethernet, or the like. Local networks in different locations may be interconnected by techniques such as packet switching, microwave links and satellite links to form a world-wide network. A network may include several hundred or more interconnected devices.

In computer networks, a number of issues arise, including traffic overload on parts of the network, optimum placement of network resources, security, isolation of network faults, and the like. These issues become more complex and difficult as networks become larger and more complex. For example, if a network device is not sending messages, it may be difficult to determine whether the fault is in the network device itself, the data communication link or an intermediate network device between the sending and receiving network devices.

Network management systems have been utilized in the past in attempts to address such issues. Prior art network management systems typically operated by remote access to and monitoring of information from network devices. The network management system collected large volumes of information which required evaluation by a network administrator. Prior art network management systems place a tremendous burden on the network administrator. He must be a networking expert in order to understand the implications of a change in a network device parameter. The administrator must also understand the topology of each section of the network in order to understand what may have caused the change. In addition, the administrator must sift through reams of information and false alarms in order to determine the cause of a problem.

It is therefore desirable to provide a network management system which can systematize the knowledge of the networking expert such that common problems can be detected, isolated and repaired, either automatically or with the involvement of less skilled personnel. Such a system must have certain characteristics in order to achieve this goal. The system must have a complete and precise representation of the network and the networking technologies involved. It is insufficient to extend prior art network management systems to include connections between devices. A network is much more than the devices and the wires which connect them. The network involves the network devices, the network protocols and the software running on the devices. Without consideration of these aspects of the network, a model is incomplete. A system must be flexible and extendable. It must allow not only for the modeling of new devices, but must allow for the modeling of new technologies, media applications and protocol. The system must provide a facility for efficiently encapsulating the expert's knowledge into the system.

It is a general object of the present invention to provide improved methods and apparatus for managing networks.

It is another object of the present invention to provide network management systems which utilize models of network entities and interrelationships between network entities.

It is a further object of the present invention to provide methods and apparatus for inferring information about network entities with which communication is impossible or impractical.

It is a further object of the present invention to provide methods and apparatus for determining the operational status of network devices, such as connectors, cables, buses, and the like, that are not capable of communication.

SUMMARY OF THE INVENTION

According to the present invention, these and other objects and advantages are achieved in a method for managing a network comprising interrelated network entities including communicating network entities and at least one non-communicating network entity. The method of the present invention permits the status of network entities such as coaxial segments, connectors, buses, rings, optical fiber segments, wide area segments, multiplexers, and the like, to be monitored by the network management system, even though such network entities cannot be directly polled. In accordance with the invention, the method for monitoring the status of the non-communicating network entity comprises the steps of providing an electronic network management system, the network management system communicating with the communicating network entities to obtain operational information as to the communicating network entities, and the network management system using the operational information as to the communicating network entities and information as to relations between the non-communicating network entity and the communicating network entities to infer the status of the non-communicating network entity. The status of the non-communicating network entity is inferred from information as to network entities connected to the non-communicating network entity.

The network management system preferably includes a representation of the network, including models and relations between models. The models include models of communicating network entities and inferred models of non-communicating network entities. Each model includes inference handlers. The inference handlers in the inferred models update status information in response to information obtained from the models of the communicating network entities.

When all network entities connected to the non-communicating network entity have a lost contact status, the contact status of the non-communicating network entity is inferred as lost. When at least one network entity connected to the non-communicating network entity has an established contact status, the contact status of the non-communicating network entity is inferred as established. The contact status of the non-communicating network entity can be provided to a user in the same manner as information relating to communicating network entities.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
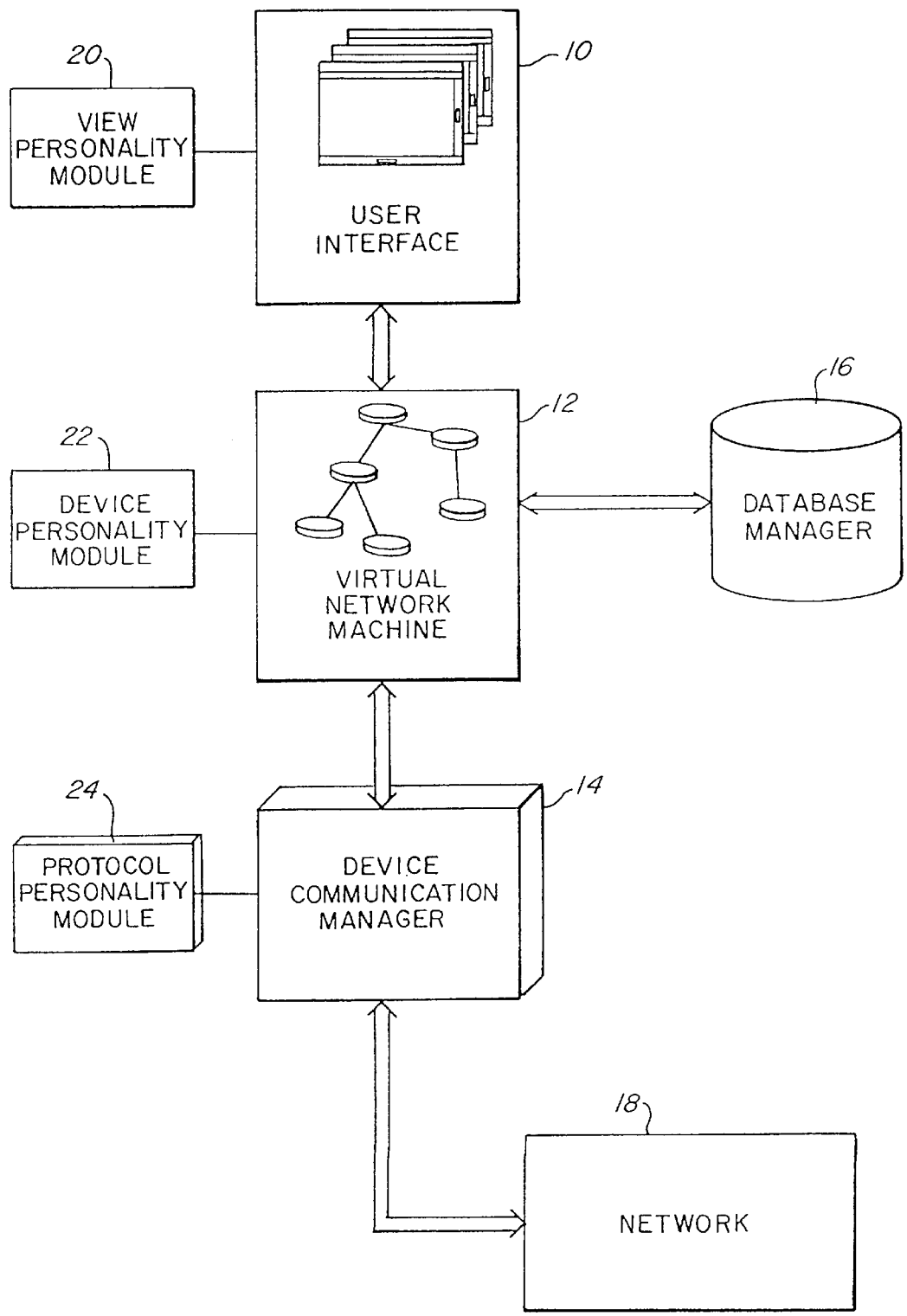
FIG. 1 is a block diagram of a network management system in accordance with the invention.

A block diagram of a network management system in accordance with the present invention is shown in FIG. 1. The major components of the network management system are a user interface 10, a virtual network machine 12, and a device communication manager 14.

The user interface 10, which may include a video display screen, keyboard, mouse and printer, provides all interaction with the user. The user interface controls the screen, keyboard, mouse and printer and provides the user with different views of the network that is being managed. The user interface receives network information from the virtual network machine 12.

The virtual network machine 12 contains a software representation of the network being managed, including models that represent the devices and other entities associated with the network, and relations between the models. The virtual network machine 12 is associated with a database manager 16 which manages the storage and retrieval of disk-based data. Such data includes configuration data, an event log, statistics, history and current state information.

The device communication manager 14 is connected to a network 18 and handles communication between the virtual network machine 12 and network devices. The data received from the network devices is provided by the device communication manager to the virtual network machine 12. The device communication manager 14 converts generic requests from the virtual network machine 12 to the required network management protocol for communicating with each network device. Existing network management protocols include Simple Network Management Protocol (SNMP), Internet Control Message Protocol (ICMP) and many proprietary network management protocols. Certain types of network devices are designed to communicate with a network management system using one of these protocols.

A view personality module 20 connected to the user interface 10 contains a collection of data modules which permit the user interface to provide different views of the network. A device personality module 22 connected to the virtual network machine 12 contains a collection of data modules which permit devices and other network entities to be configured and managed with the network management system. A protocol personality module 24 connected to the device communication manager contains a collection of data modules which permit communication with all devices that communicate using the network management protocols specified by the module 24.

The personality modules 20, 22 and 24 provide a system that is highly flexible and user configurable. By altering the personality module 20, the user can specify customized views or displays. By changing the device personality module 22, the user can add new types of network devices to the system. Similarly, by changing the protocol personality module 24, the network management system can operate with new or different network management protocols. The personality modules permit the system to be reconfigured and customized without changing the basic control code of the system.

The overall software architecture of the present invention is shown in FIG. 1. The hardware for supporting the system of FIG. 1 is typically a workstation such as a Sun Model 3 or 4, or a 386 PC compatible computer running Unix. In this embodiment, a minimum of 8 megabytes of memory is required with a display device which supports a minimum of 640×680 pixels×256 color resolution. The basic software includes a Unix release that supports sockets, X-windows and Open Software Foundation Motif 1.0. The network management system of the present invention is implemented using the C++ programming language, but could be implemented in other object-oriented languages such as Eiffel, Smalltalk, ADA, or the like. The virtual network machine 12 and the device communication manager 14 may be run on a separate computer from the user interface 10 for increased operating speed or increased reliability. It is understood that the present invention is in no way limited to any particular hardware, e.g., Sun Model 3 or 4, or operating system, e.g., Unix.

Figure 2:
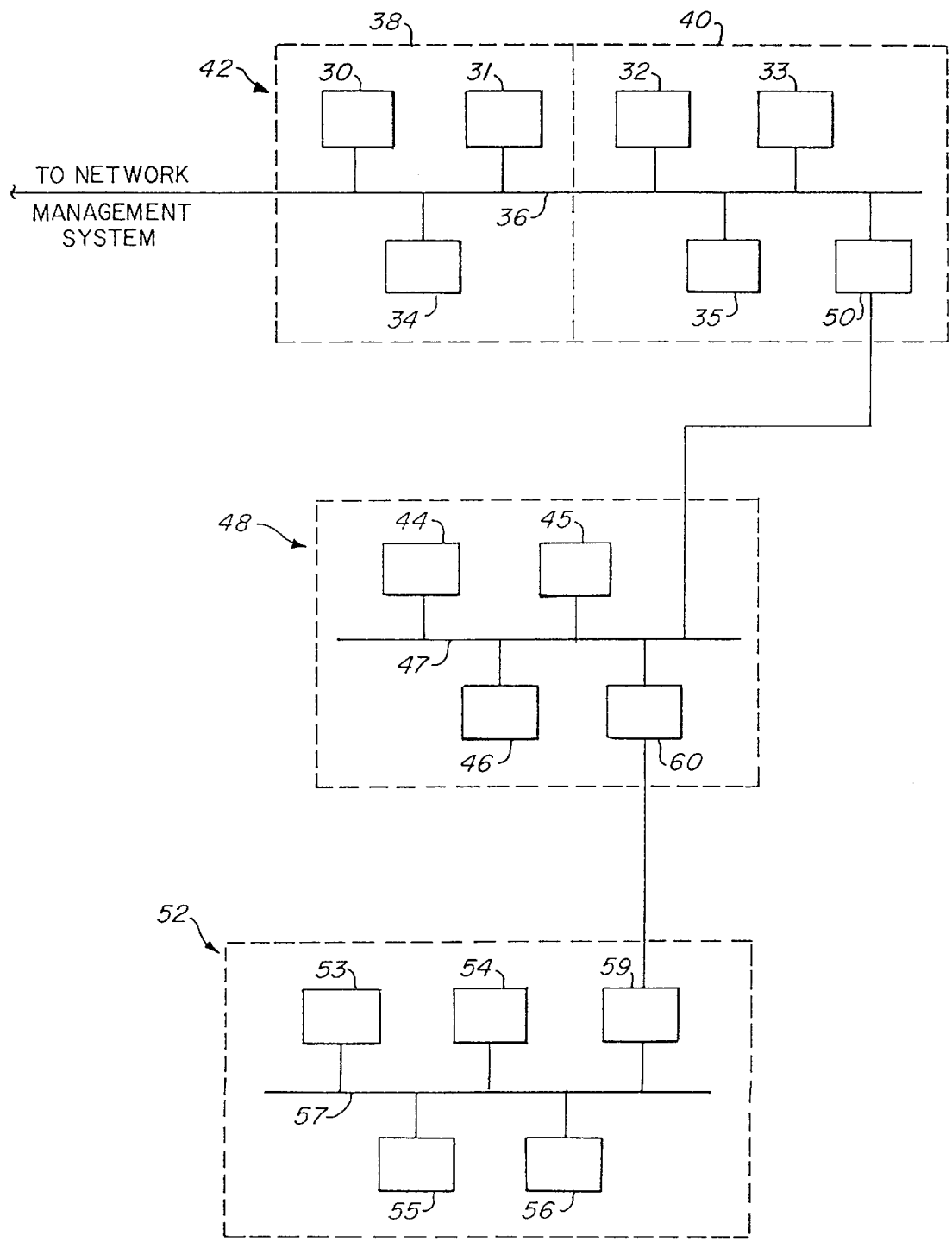
FIG. 2 is a block diagram showing an example of a network.

An example of a network is shown in FIG. 2. The network includes workstations 30, 31, 32, 33 and disk units 34 and 35 interconnected by a data bus 36. Workstations 30 and 31 and disk unit 34 are located in a room 38, and workstations 32 and 33 and disk unit 35 are located in a room 40. The rooms 38 and 40 are located within a building 42. Network devices 44, 45 and 46 are interconnected by a data bus 47 and are located in a building 48 at the same site as building 42. The network portions in buildings 42 and 48 are interconnected by a bridge 50. A building 52 remotely located (in a different city, state or country) from buildings 42 and 48, contains network devices 53, 54, 55 and 56 interconnected by a data bus 57. The network devices in building 52 are interconnected to the network in building 48 by interface devices 59 and 60, which may communicate by a packet switching system, a microwave link or a satellite link. The network management system shown in FIG. 1 and described above is connected to the network of FIG. 2 at any convenient point, such as data bus 36.

In general, the network management system shown in FIG. 1 performs two major operations during normal operation. It services user requests entered by the user at user interface 10 and provides network information such as alarms and events to user interface 10. In addition, the virtual network machine 12 polls the network to obtain information for updating the network models as described hereinafter. In some cases, the network devices send status information to the network management system automatically without polling. In other cases the device models infer status information from data gathered for other models. In any case, the information received from the network is processed so that the operational status, faults and other information pertaining to the network are presented to the user in a systematized and organized manner.

As indicated above, the network entities that make up the network that is being managed by the network management system are represented by software models in the virtual network machine 12. The models represent network devices such as printed circuit boards, printed circuit board racks, bridges, routers, hubs, cables and the like. The models also represent locations or topologies. Location models represent the parts of a network geographically associated with a building, country, floor, panel, rack, region, room, section, sector, site or the world. Topological models represent the network devices that are topologically associated with a local area network or subnetwork. Models can also represent components of network devices such as individual printed circuit boards, ports and the like. In addition, models can represent software applications such as data relay, network monitor, terminal server and end point operations. In general, models can represent any network entity that is of interest in connection with managing or monitoring the network.

The virtual network machine includes a collection of models which represent the various network entities. In a preferred embodiment, the models themselves are collections of C++ objects. The virtual network machine also includes model relations which define the interrelationships between the various models. Several types of relations can be specified. A "connects to" relation is used to specify an interconnection between network devices. For example, the interconnection between two workstations is specified by a "connects to" relation. A "contains" relation is used to specify a network entity that is contained within another network entity. Thus for example, a workstation model may be contained in a room, building or local network model. An "executes" relation is used to specify the relation between a software application and the network device on which it runs. An "is part of" relation specifies the relation between a network device and its components. For example, a port model may be part of a board model or a card rack model.

Relations are specified as pairs of models, known as associations. The relations can specify peer-to-peer associations and hierarchical associations.

Each model includes a number of attributes and one or more inference handlers. The attributes are data which define the characteristics and status of the network entity being modeled. Basic attributes include a model name, a model type name, a model type handle, a polling interval, a next-time-to-poll, a retry count, a contact status, an activation status, a time-of-last-poll and statistics pertaining to the network entity which is being modeled. Polling of network devices will be described hereinafter. In addition, attributes that are unique to a particular type of network device can be defined. For example, a network bridge contains a table that defines the devices that are located on each side of the bridge. A model of the network bridge can contain, as one of its attributes, a copy of the table.

In a preferred embodiment of the invention, each attribute contained in a model type includes the following:

(1) An attribute name that identifies the attribute.

(2) An attribute type that defines the kind of attribute. Attribute types may include Boolean values, integers, counters, dates, text strings, and the like.

(3) Attribute flags indicate how the attribute is to be manipulated. A memory flag indicates that the attribute is stored in memory. A database flag indicates that the attribute is maintained in the database of the virtual network machine. An external flag indicates that the attribute is maintained in the device being modeled. A polled flag indicates that the attributes value should be periodically surveyed or polled by the device being modeled. The flags also indicate whether the attribute is readable or writable by the user.

(4) Object identifier is the identifier used to access the attribute in the device. It is defined by the network management protocol used to access the device.

(5) Attribute help string is a text string which contains a description of the defined attribute. When the user asks for help regarding this attribute, the text string appears on the user interface screen.

(6) Attribute value is the value of the attribute.

The models used in the virtual network machine also include one or more inference handlers. An inference handler in this embodiment is a C++ object which performs a specified computation, decision, action or inference. The inference handlers collectively constitute the intelligence of the model. An individual inference handler is defined by the type of processing performed, the source or sources of the stimulus and the destination of the result. The result is an output of an inherence handler and may include attribute changes, creation or destruction of models, alarms or any other valid output. The operation of the inference handler is initiated by a trigger, which is an event occurring in the virtual network machine. Triggers include attribute changes in the same model, attribute changes in another model, relation changes, events, model creation or destruction, and the like. Thus, each model includes inference handlers which perform specified functions upon the occurrence of predetermined events which trigger the inference handlers.

Figure 3:
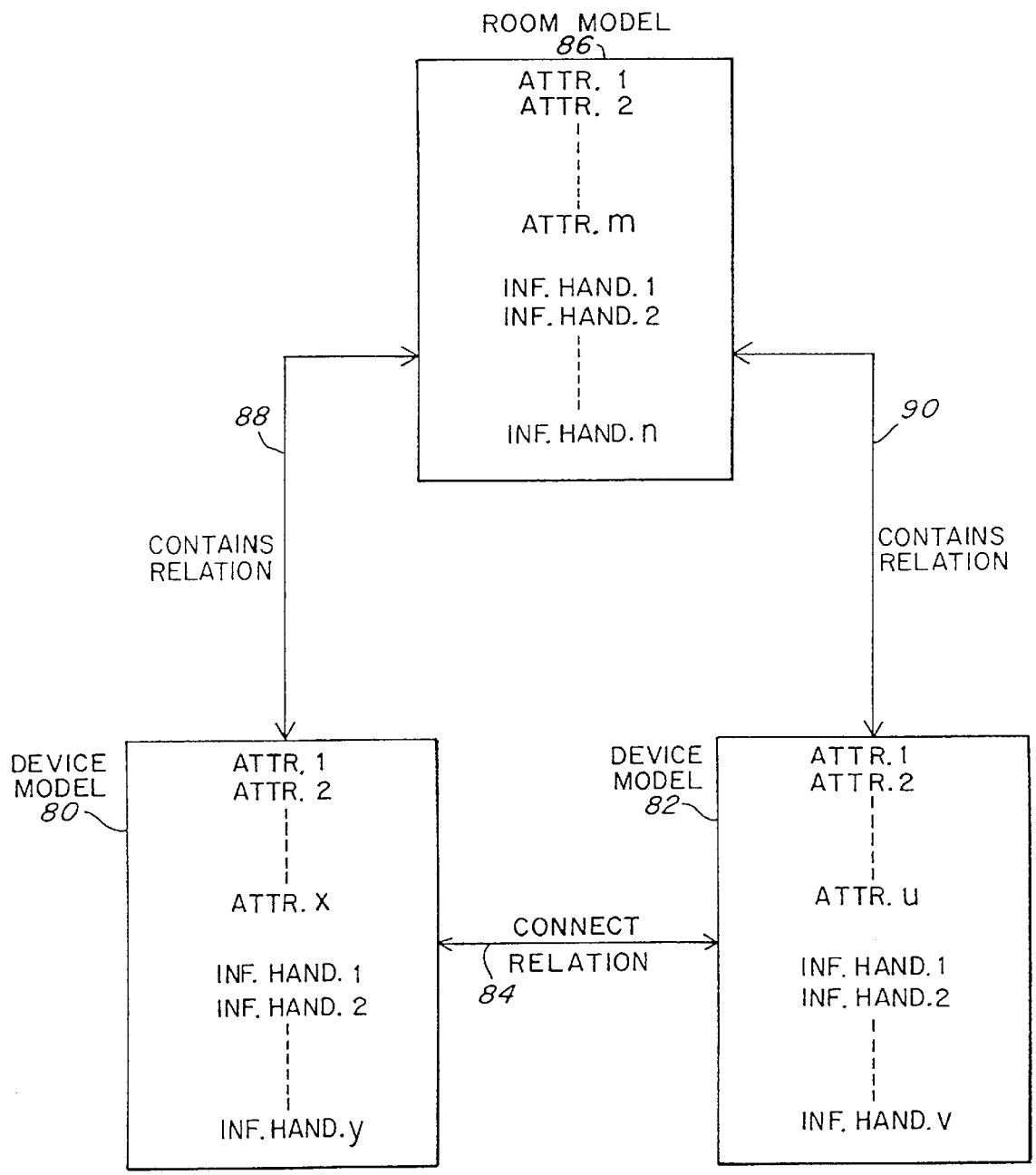
FIG. 3 is a schematic diagram showing the structure of models and the relations between models.

A schematic diagram of a simple model configuration is shown in FIG. 3 to illustrate the concepts of the present invention. A device model 80 includes attributes 1 to x and inference handlers 1 to y. A device model 82 includes attributes 1 to u and inference handlers 1 to v. A connect relation 84 indicates that models 80 and 82 are connected in the physical network. A room model 86 includes attributes 1 to m and inference handlers 1 to n. A relation 88 indicates that model 80 is contained within room model 86, and a relation 90 indicates that model 82 is contained within room model 86. Each of the models and the model relations shown in FIG. 3 is implemented as a C++ object. It will be understood that a representation of an actual network would be much more complex than the configuration shown in FIG. 3 and, as noted above, that the present invention is not limited to a particular programming language.

As discussed above, the collection of models and model relations in the virtual network machine form a representation of the physical network being managed. The models represent not only the configuration of the network, but also represent its status on a dynamic basis. The status of the network and other information and data relating to the network is obtained by the models in a number of different ways. A primary technique for obtaining information from the network involves polling. At specified intervals, a model in the virtual network machine 12 requests the device communication manager 14 to poll the network device which corresponds to the model. The device communication manager 14 converts the request to the necessary protocol for communicating with the network device. The network device returns the requested information to the device communication manager 14, which extracts the device information and forwards it to the virtual network machine 12 for updating one or more attributes in the model of the network device. The polling interval is specified individually for each model and corresponding network device, depending on the importance of the attribute, the frequency with which it is likely to change, and the like. The polling interval, in general, is a compromise between a desire that the models accurately reflect the present status of the network device and a desire to minimize network management traffic which could adversely impact normal network operation.

According to another technique for updating the information contained in the models, the network devices automatically transmit information to the network management system upon the occurrence of significant events without polling. This requires that the network devices be preprogrammed for such operation.

It will be understood that communication between a model and its corresponding network entity is possible only for certain types of devices such as bridges, card racks, hubs, etc. In other cases, the network entity being modeled is not capable of communicating its status to the network management system. For example, models of buildings or rooms containing network devices and models of cables cannot communicate with the corresponding network entities. In this case, the status of the network entity is inferred by the model from information contained in models of other network devices. Since successful polling of a network device connected to a cable may indicate that the cable is functioning properly, the status of the cable can be inferred from information contained in a model of the attached network device. Similarly, the operational status of a room can be inferred from the operational status contained in models of the network devices located within the room. In order for a model to make such inferences, it is necessary for the model to obtain information from related models. In a function called a model watch, an attribute in one model is monitored or watched by one or more other models. A change in the watched attribute may trigger inference handlers in the watching models.

The virtual network machine also includes an event log, a statistics log and an alarm log. These logs permit information contained in the models to be organized and presented to the user and to be recorded in the database.

The event message provides specific information about events, including alarms that have occurred in a given model. The events pass from the model to an event log manager which records the event in the external database. An event message is also sent to the user interface based on event filters, as discussed below. The user can request event information from the database. An event message includes a model handle, a model-type handle, an event date and time, an event type and subtype, an event severity, a model name, a model-type name, an event user name, an event data count and event variable data. The event variable data permits additional information to be provided about the event.

Event messages sent to the user interface can utilize a filter process that is specified by the user. The user can specify model types and a minimum event severity for which events will be displayed on the user screen. Events from unspecified model types or less than the minimum severity will not be displayed. Many other event selection or filtering criteria can be used. In general, any information contained in the event message can be used for event filtering.

Statistics history messages are similar to the event messages described above. The statistics information includes any model parameters or functions which the user wishes to monitor. A statistics history message passes from the model to a statistics log manager and subsequently to the external database. The statistics message is also sent to the user interface based upon predefined filter parameters. The user can request the statistics log manager to obtain and display statistics information from the external database. Statistics messages are compiled whenever a device read procedure occurs.

When an alarm event occurs in a model, a notice of the alarm event is sent to an alarm log and to the event log. The alarm log selects the most severe alarm for each model which is registering an alarm. The alarms are sent to an alarm window in the user interface. The user can obtain more information on the alarm message by pressing an appropriate button on the window display. Alarm log messages include the following parameters: alarm condition, alarm cause, alarm status, alarm security data, alarm clear switch and alarm unique ID.

Figure 4:
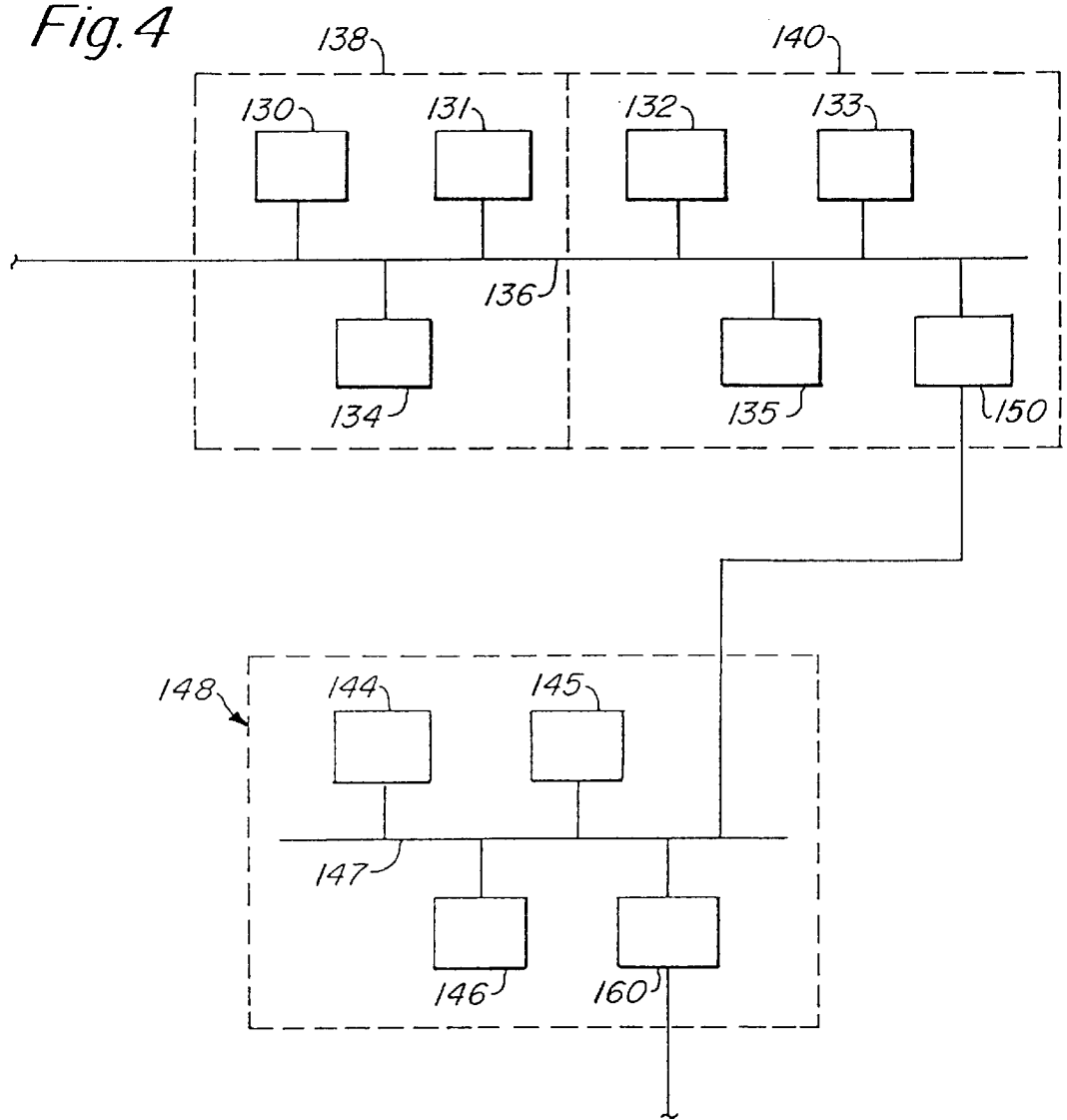
FIG. 4 is a block diagram showing a portion of the representation of the network of FIG. 2 in the virtual network machine.
Figure 5:
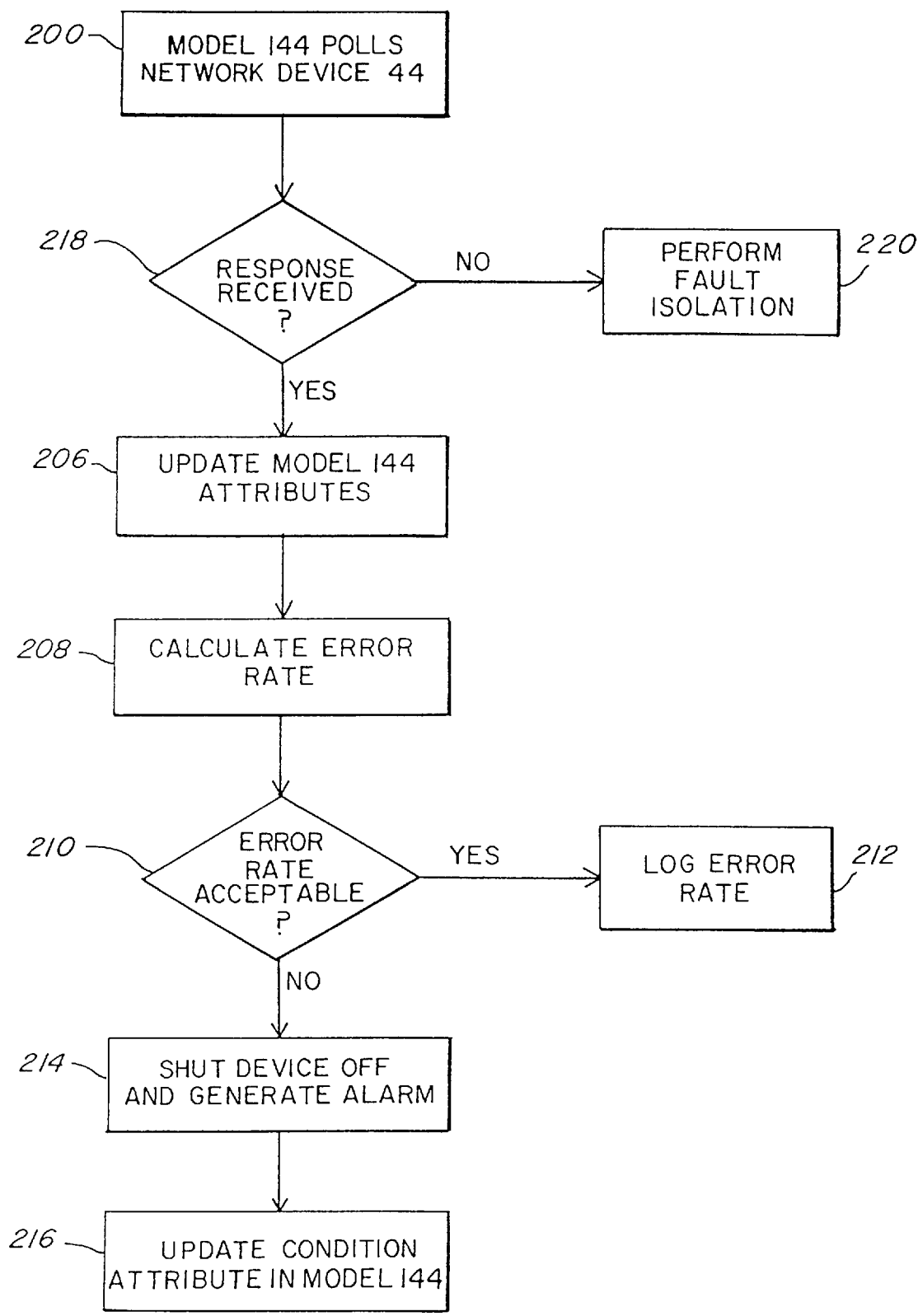
FIG. 5 is a flow chart illustrating an example of operation of the virtual network machine.

An example will now be given to illustrate the operation of the virtual network machine 12. A portion of the virtual machine 12 is shown schematically in FIG. 4. The models shown in FIG. 4 correspond to network entities shown in FIG. 2. A flow chart illustrating the example is shown in FIG. 5. Each network device has a model in the virtual network machine 12. Thus, for example, model 144 corresponds to network device 44, model 145 corresponds to network device 45, etc. Models 144 and 145 are related by connection relation 147 which corresponds to data bus 47. Room model 148 is related to models 144 and 145 by a contains relation.

In operation, at a specified time model 144 initiates polling of network device 44 in step 200 in order to obtain an update of the status of network device 44. The model 144 sends a request to the device communication manager 14 to poll network device 44. The device communication manager 14 converts the request to the required protocol for communication with network device 44 and sends the message. The requested information may, for example, be the number of packets sent on the network in a given time and the number of errors that occurred. When the requested information is returned to model 144, the corresponding attributes in model 144 are updated in step 206 and an error rate inference handler is triggered. The error rate inference handler in step 208 calculates the error rate for network device 44. If the error rate is within prescribed limits (step 210), an error rate attribute is updated, and the new information is logged into the database (step 212). If the calculated error rate is above a predetermined limit, an error alarm inference handler is triggered. The error alarm inference handler may shut off the corresponding network device 44 and send an alarm to the user interface in step 214. The alarm is also logged in the database. If the network device 44 is shut off in response to a high error rate, a condition attribute in model 144 is updated to reflect the off condition in step 216. If no response was received from the network device 44 when it was polled (step 218), a fault isolation inference handler is triggered in step 220. The fault isolation inference handler operates as described below to determine the network component which caused network device 44 to fail to respond to the poll. When the cause of the fault is determined, a fault message is sent to the user interface.

Polling of network device 44 is repeated at intervals specified by an attribute contained in model 144. In addition, other network devices are polled at intervals which may be different for each network device. The information returned to each model is processed by the inference handlers for that model and by inference handlers in other models that are watching such information. In general, each model type may include a different set of inference handlers.

As described above, an attribute change in one model can trigger an inference handler in one or more other models and thereby produce a chain of actions or responses to the attribute change. For example, if a fault occurs in a network device, the condition attribute of that device is changed in the corresponding model. The condition change may trigger a condition change in the model of the room which contains the device. Likewise, the condition change in the room may trigger a condition change in the building or site model. The condition attribute in each model may have a different level of significance. For example, failure of a device may have a high significance in the network device model but a relatively low significance in the site model.

The software models and model relations that are representative of a network as described herein are highly flexible and adaptable to new network configurations and new management functions. New models and model relations are easily added to the virtual network machine to accommodate the needs of the user. The use of the C++ programming language permits new model types to be derived from existing model types. Thus, the virtual network machine 12 can be customized for a particular application. As noted above, the present invention should not be construed as limited to any particular programming language.

A model type editor is used to modify and control the models in the virtual network machine 12. The following functions are provided:

(1) Describe ( ) describes some aspect of the specified model type.

(2) Create ( ) creates a new model for the specified model type.

(3) Destroy ( ) removes the specified model from the configuration.

(4) Read ( ) reads the value of the specified attribute from a model.

(5) Write ( ) writes the given values to the attributes of the model.

(6) Action ( ) performs the specified action.

(7) Generate event ( ) creates an event message.

Similarly, the model relations can be edited by the user. The following functions can be performed on model relations.

(1) Describe ( ) describes an aspect of the specified relation.

(2) Read ( ) reads a set of associations.

(3) Add ( ) adds an association.

(4) Remove ( ) removes a set of associations.

(5) Count ( ) returns the number of associations that match the selection criteria.

(6) Read rule ( ) reads a set of relation rules.

As indicated above, each inference handler is triggered by the occurrence of a specified event or events. The user must register the inference handler to receive the trigger. An inference handler can be triggered upon the creation or destruction of a model, the activation or initializing of a model, the change of an attribute in the same model, the change of an attribute in a watched model, the addition or removal of a relation, the occurrence of a specified event or a user-defined action.

The virtual network machine described above including models and model relations provides a very general approach to network management. By customizing the virtual network machine, virtually any network management function can be implemented. Both data (attributes) and intelligence (inference handlers) are encapsulated into a model of a network entity. New models can be generated by combining or modifying existing models since the models are implemented in the C++ programming language. A model can be identified by a variety of different dimensions or names, depending on the attributes specified. For example, a particular network device can be identified as a device, a type of device, or by vendor or model number. Models are interrelated with each other by different types of relations. The relations permit stimulus-response chaining. The model approach provides loosely-coupled intelligent models with interaction between models according to specified triggers. The system has data location independence. The data for operation of the virtual network machine may reside in the database, memory or in the physical network which is being modeled.

An important function of a network management system is the identification and isolation of faults. When the network management system loses contact with a network device, the reason for the loss of contact must be determined so that appropriate action, such as a service call, can be taken. In a network environment, loss of contact with a network device may be due to failure of that network device or to failure of another network device that is involved in transmission of the message. For example, with reference to FIG. 2, assume that contact is lost with network device 53. The loss of contact could be due to the failure of network device 53, but could also be due to the failure of network devices 50, 60 or 59. In prior art network management systems, the network administrator was typically provided with a list of possible causes of a fault and was required to isolate the fault based on his experience and knowledge of the network.

In accordance with a feature of the present invention, the network management system isolates network faults using a technique known as status suppression. When contact between a model and its corresponding network device is lost, the model sets a fault status and initiates the fault isolation technique. According to the fault isolation technique, the model (first model) which lost contact with its corresponding network device (first network device) determines whether adjacent models have lost contact with their corresponding network devices. In this context, adjacent network devices are defined as those which are directly connected to a specified network device. If adjacent models cannot contact the corresponding network devices, then the first network device cannot be the cause of the fault, and its fault status in the first model is suppressed or overridden. By suppressing the fault status of the network devices which are determined not to be defective, the defective network device can be identified.

The fault isolation technique is advantageously implemented in the conjunction with the model-based representation of the network and polling of network devices as described above. In a preferred embodiment of the fault isolation technique, each model that is capable of polling its corresponding network device maintains a fault status for that device. If contact with the device is lost, the fault status is set. Each such model also maintains a count of the number of network devices that are directly connected to the network device. In addition, each such model maintains a count of the number of adjacent network devices for which contact has been lost. This information is determined by each model watching the fault status in models corresponding to adjacent network devices. When a given model loses contact with its corresponding network device, two operations are performed. First, the fault status of the model is set. Second, the count of total adjacent devices is compared with the count of adjacent devices for which the fault status is set. If the counts are equal, all adjacent models have lost contact with their corresponding network devices, and the fault status of the first model is suppressed.

Since models that are capable of polling network devices perform polling regularly on an asynchronous basis, the fault status of each such model is regularly updated. However, when the fault isolation technique described above is used, the fault status is suppressed in those models which are determined not to be defective. Thus, the fault status contained in the models is an accurate representation of defective network devices.

Figure 6:
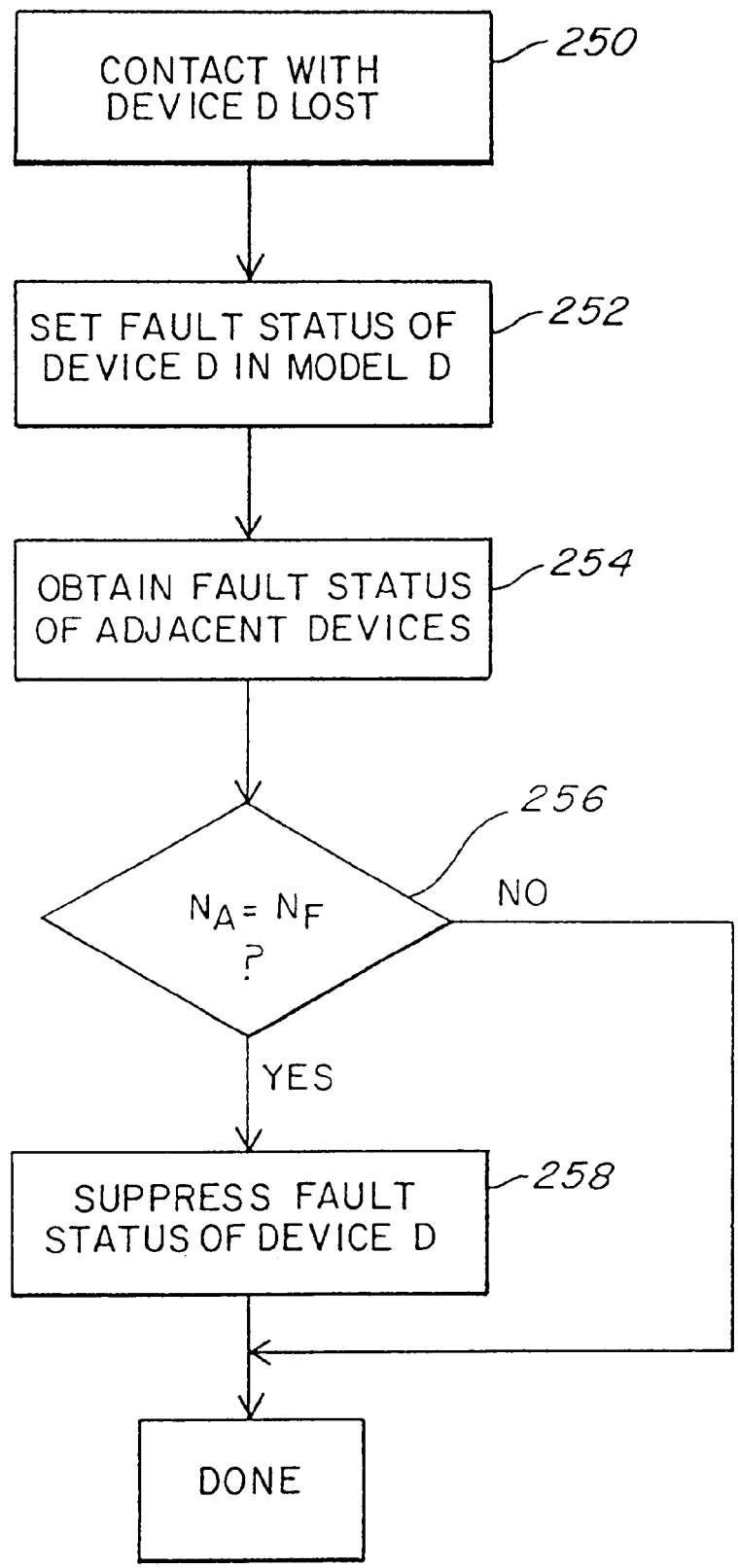
FIG. 6 is a flow chart of a fault isolation technique in accordance with the present invention.

A flow chart of the fault isolation technique is shown in FIG. 6. When a model D loses contact with the corresponding network device D (step 250), model D sets its fault status in step 252. Model D then obtains the fault status of all devices which are adjacent to device D in step 252. The fault status of adjacent devices is determined from the fault status maintained in models of adjacent devices. In step 256 the number of adjacent devices $N_A$ adjacent to device D is compared with the number of adjacent devices having a fault $N_F$. If $N_A$ is not equal to $N_F$, contact can be made with at least one device adjacent to device D, and the fault status of device D is maintained. If $N_A=N_F$, contact has been lost with all devices adjacent to device D and the fault status of device D is suppressed in step 258. As described above, this procedure is performed each time a model loses contact with its corresponding network device.

By way of example, assume that model 144 (FIG. 4) is unable to contact its corresponding network device 44 (FIG. 2). The model 144 sets its fault status and obtains the fault status of adjacent devices 45, 46, 60 and 50 from the corresponding models. Assume in this case that the cause of the fault is the bridge device 50. Since the adjacent devices 45, 46, 60 and 50 cannot be contacted by the corresponding models, the fault status of these devices will be set in the corresponding models. Model 144 will therefore determine that the fault status of all adjacent devices is set and will suppress its own fault status. In this example, the topological configuration of the network and the corresponding models are used to isolate the source of a fault and to suppress the fault status of downstream network devices.

The fault isolation technique described above can also be applied in a geographical configuration. For example, assume that contact is lost with network devices 30, 31 and 34 in room 38 as shown in FIG. 2. In this case, it is likely that all devices within the room have failed due to a power loss or a failure of data bus 36. In this case, the fault status of devices 30, 31 and 34 is suppressed in corresponding models 130, 131 and 134, and the fault status of room 42 is maintained.

The above examples relate to hardware faults. The fault isolation technique of the invention can also be applied to isolation of software faults. As indicated above, the virtual network machine may include models of application software running on the network devices. Assume, for example, that contact is lost with an electronic mail application running on a specified network device. The electronic mail application may depend on other software, such as a file transfer module, for its operation. The electronic mail application may have failed to respond because of a failure of the file transfer module. The technique described above can be utilized to isolate the software application having a fault.

The fault isolation technique described above is particularly useful in a network management system utilizing model-based intelligence as described above. However, the fault isolation technique is not limited to such use. The fault isolation technique of determining the fault status of adjacent devices and suppressing the fault status of the first device when the fault status of all adjacent devices is set, can be applied in a network management system that does not use models of network entities. Furthermore, the fault isolation technique is not limited to network management systems. The technique is more generally applicable to any system where it is desired to determine and isolate the cause of a problem or fault by suppressing symptomatic information.

As indicated above, the user interface 10 provides information concerning the network to a user. The primary device for presenting network information to the user is a video display screen. The display screen utilizes a high resolution, window-based display system to provide different views or displays of the network configuration and operation. The user display is based on the X-Window system which includes routines for generating the appropriate display or view based on input data. The X-Window system is a standard window controller developed by the X-Consortium at Massachusetts Institute of Technology. The display screen is used in conjunction with a mouse to permit the user to select different views of the network. It will be understood that the user interface can be implemented using other window-based systems.

The network management system provides multiple views, including location views, topological views and generic views, of the network. Multifunction icons are used in some views to represent different network entities. The location and topological views are organized in a hierarchical manner. By clicking on specified elements of a view, the user can obtain a view of the next lower level in the hierarchy. As used herein, "clicking" refers to using the mouse to move the cursor to a specified location on the display screen and then depressing the mouse button.

In the location views, the highest level may show a map of the world with network locations indicated thereon. Intermediate views may show a map of a country or a region, while lower level views may show the floor plan of a building or room that contains network devices. At the lowest level, the user may obtain a pictorial view of an individual device.

Figure 7A:
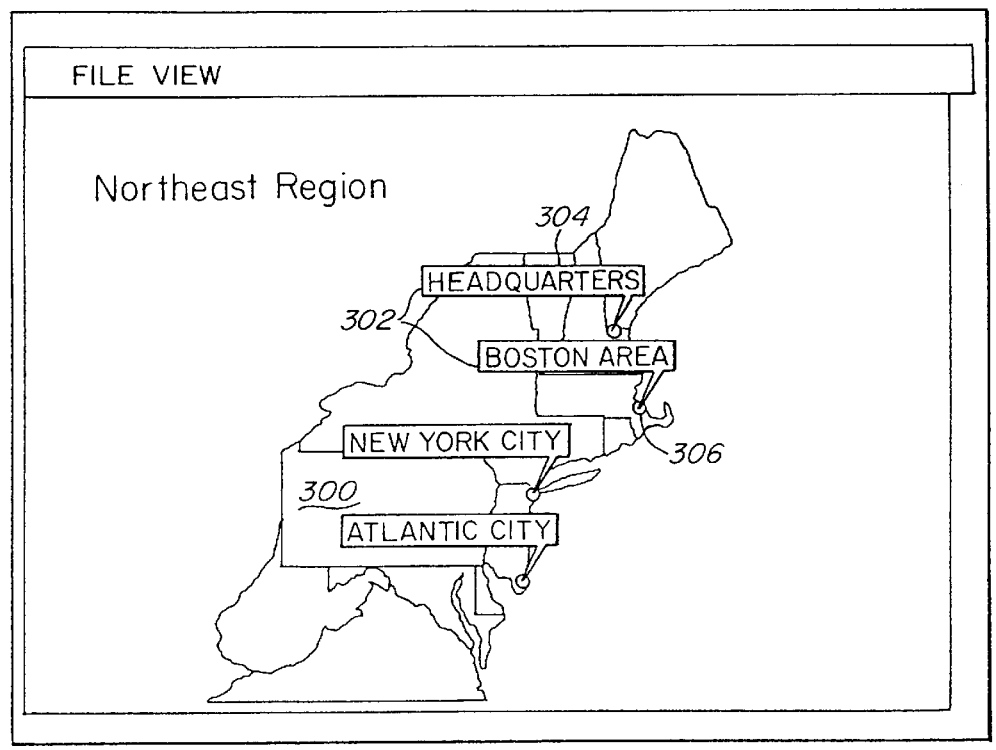
FIGS. 7A–7C show examples of location display views provided by the network management system.
Figure 7B:
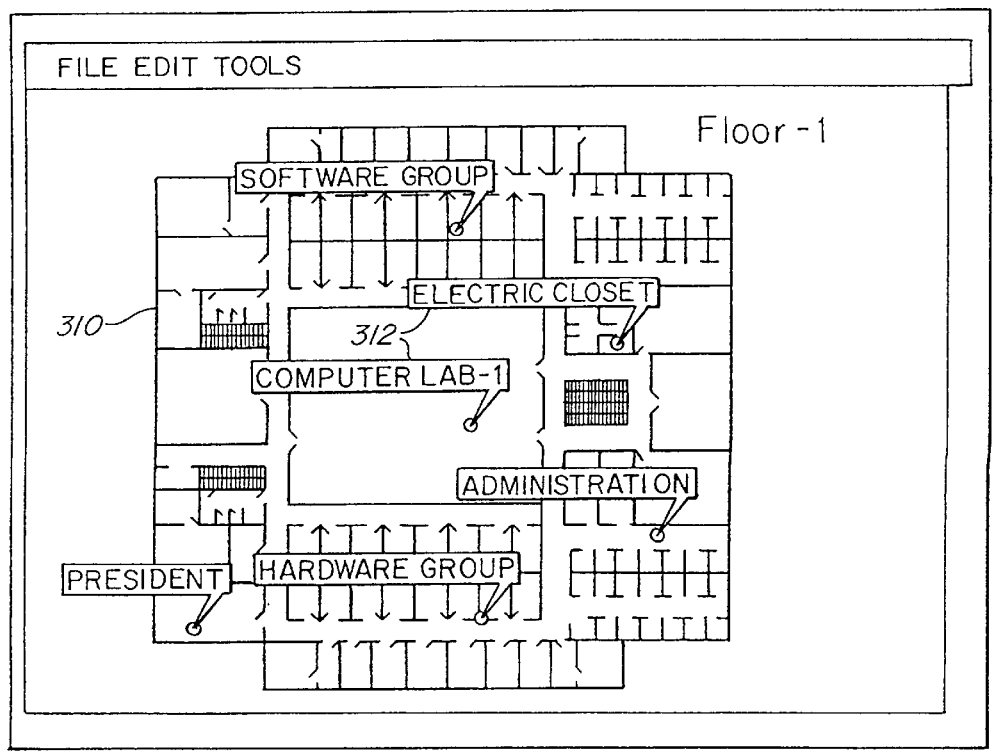
Figure 7C:
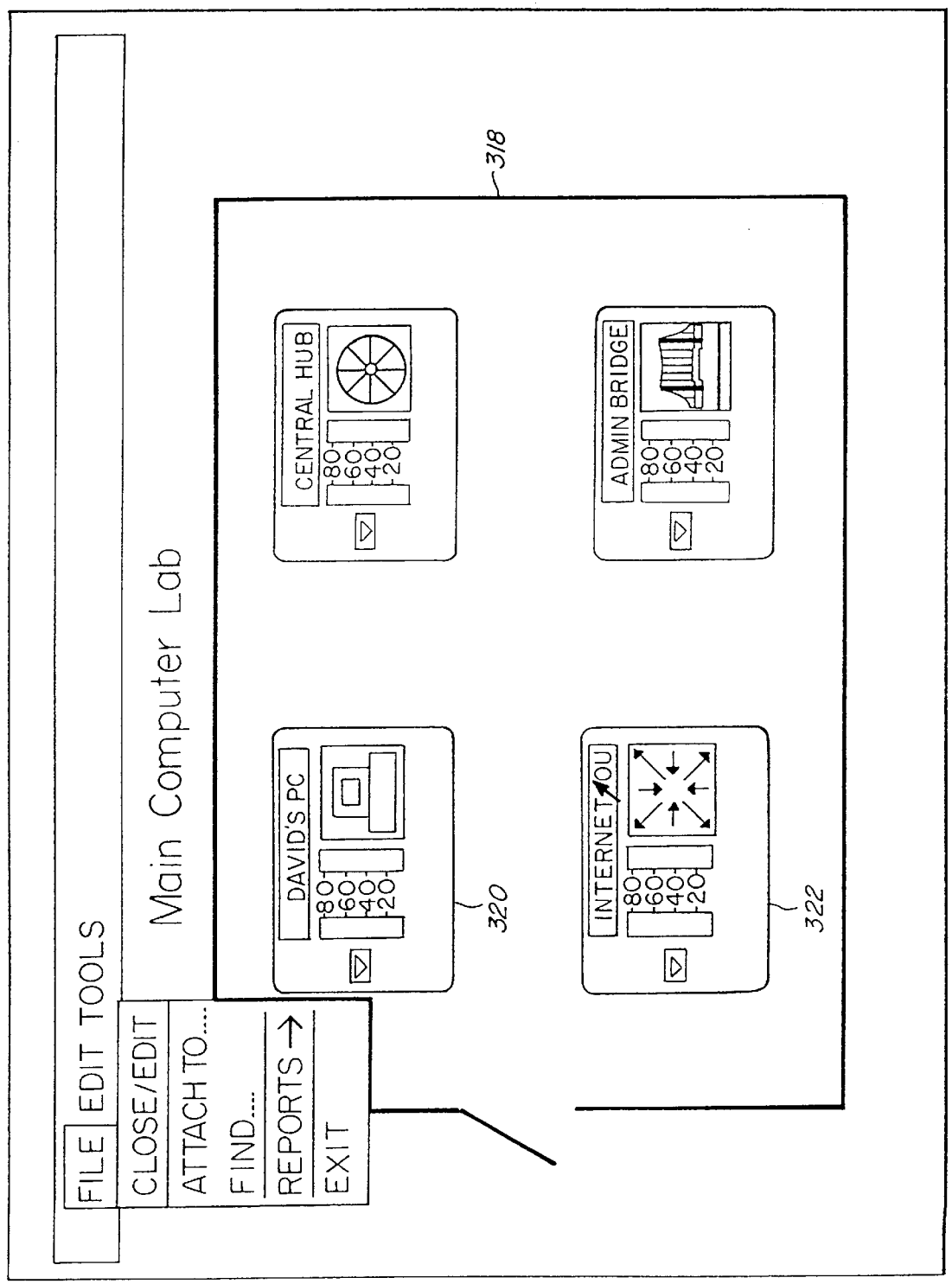

Examples of location views are shown in FIGS. 7A–7C. A map 300 of the northeast region, with network locations indicated by icons 302, is shown in FIG. 7A. The icons 302 each include a name label 304 pointing to a circle 306 which indicates a network location. The color of the circle 306 indicates a status of that location. For example, green may indicate a normal status, whereas red may indicate a fault or trouble status. By clicking on one of the network locations, the next lower level location view can be obtained. In this example, a floor plan 310 of the headquarters network is shown in FIG. 7B. Locations of network devices are indicated by icons 312 which are similar to ions 302 described above. By clicking on one of the icons 312 shown in FIG. 7B, a location view of a single room 318 is displayed as shown in FIG. 7C. In this case, the network devices contained within a computer lab are represented by multifunction icons 320, 322, which will be described in detail hereinafter.

In the topological views, a similar hierarchy is utilized, and the connections between network elements are shown. At the highest level, network interconnections at a worldwide or national level are shown. At each lower level, more detailed views, such as local area networks and subnetworks, are shown.

Figure 8A:
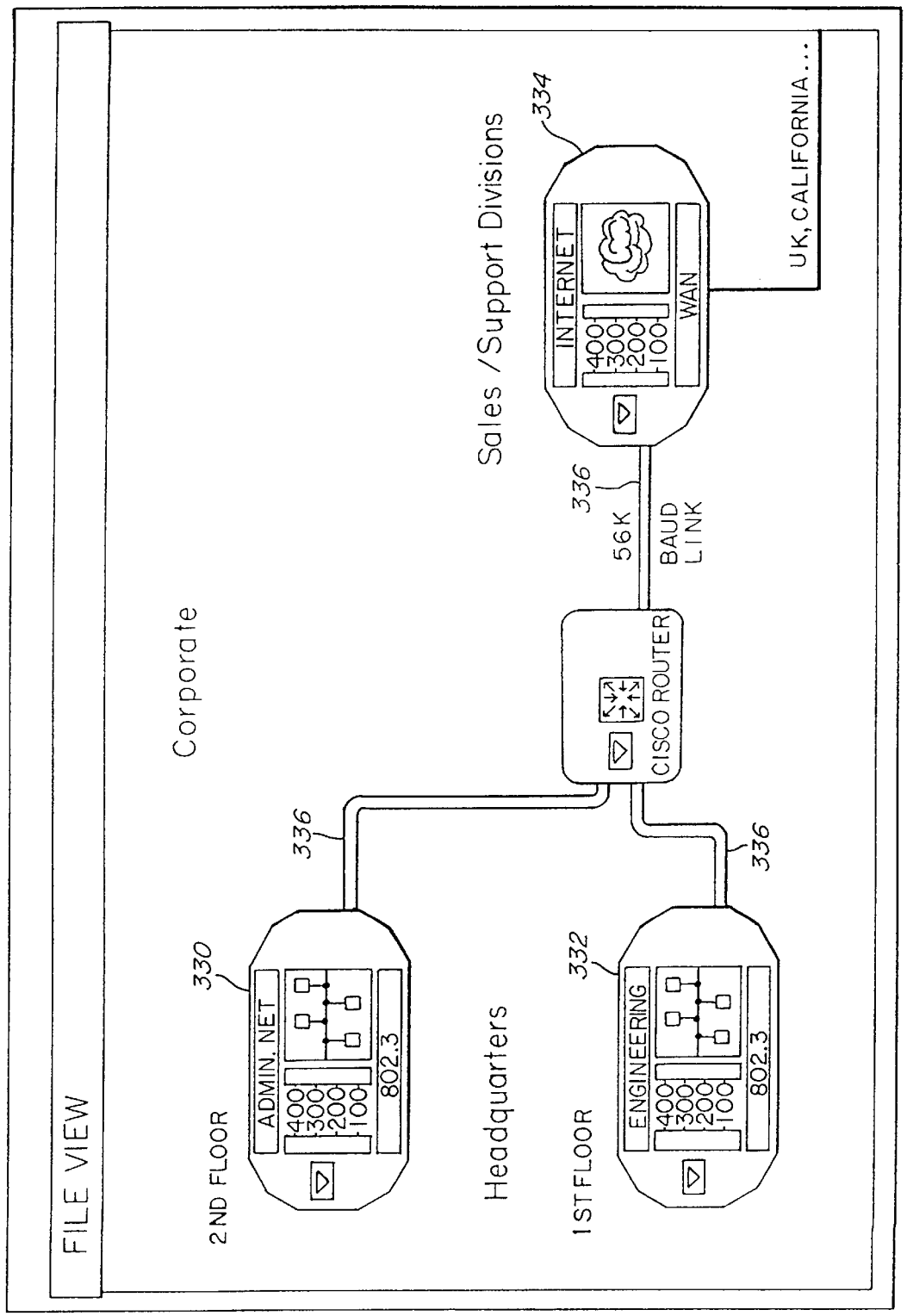
FIGS. 8A and 8B show examples of topological display views provided by the network management system.
Figure 8B:
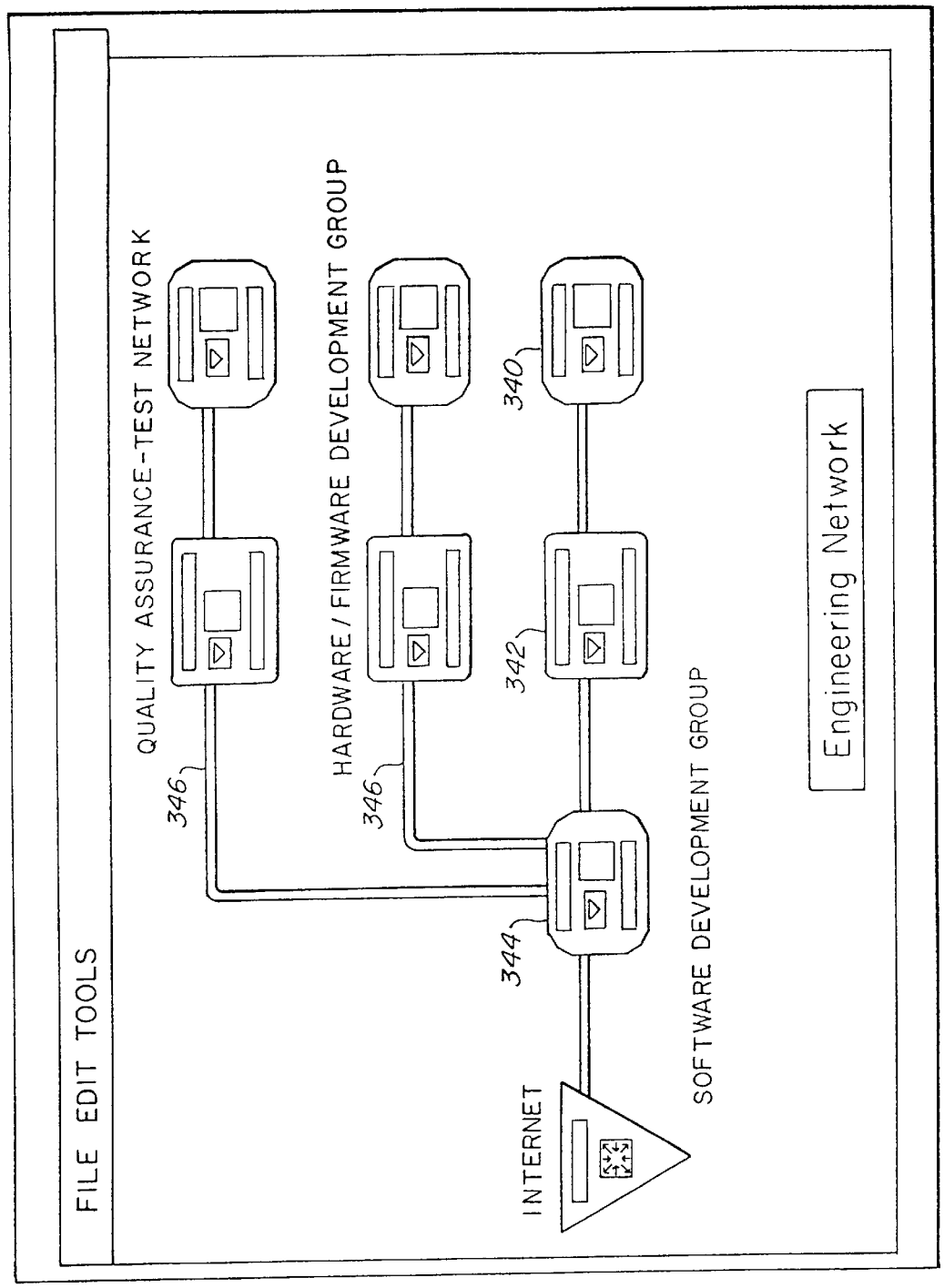

Examples of topological views are shown in FIGS. 8A and 8B. In FIG. 8A, a topological view of a corporate site is shown. An administration network icon 330 and an engineering network icon 332 are interconnected to an Internet icon 334 by links 336. Each network is represented by a multifunction icon. By clicking on the engineering network icon 332, a view of the details of the engineering network is obtained, as shown in FIG. 8B. The network devices in the engineering network are represented by multifunction icons 340, 342, 344, and the interconnections 346 between network devices are shown.

The location and topological views represent different dimensions of the same network. The user can traverse between location and topological views to obtain any necessary information regarding the configuration of the network. The user display also provides generic views such as an alarm log, an event log, a text display, a chart, or any other way of displaying attribute information. The user traverses between available views to obtain required network information. There are two basic ways of traversing between views. As indicated above, the user can click on icons in the location and topological views to traverse to the next lower level in the hierarchy of views. Also, the different views include pull-down menus, as commonly used in window-based displays, which permit selection of any desired view.

Each view that is available to the user has a corresponding view manager in the user interface. Similarly, each icon has a corresponding icon manager in the user interface. The view manager serves as the common parent for all parent icon managers associated with a given view. The view manager saves icon screen placement information and the associated virtual network machine model handles that the icons represent. The view manager determines other views to which a user may traverse from the current view. The view manager displays appropriate menu items and allows the user to select other views. The view manager may permit the user to traverse from a location view to a topological view, or vice versa.

The icon manager class is an instantiated C++ class with one or more icon managers controlling each icon. Each icon manager controls some part of the on-screen display, such as a bar graph, an arrow or the entire background of an icon. The icon manager represents a model within the virtual network machine and contains a representation of the virtual network machine model at the current time. The icon manager can communicate with the virtual network machine model that it represents. When attribute data within the virtual network machine model changes, the appropriate icon manager is notified of the change and modifies the icon appearance to reflect the new state, the new statistics or appropriate error conditions. Thus, the icon manager displays data from the virtual machine model which it represents.

Icon managers are structured in a hierarchical manner. A parent icon manager may control a background picture of an icon, and the parent typically has a group of children icon managers attached it. Each icon manager has associated with it the model handle of the virtual network machine model which it represents.

The icon manager can place a watch on the virtual network machine model that it represents. The watch informs the model that an icon manager now represents that model within the user interface. Any changes in the state of the model are forwarded to the corresponding icon manager. The watch includes a parameter that specifies the severity level of the watch. A change in model attribute data must be equal to or greater than the severity level set within the model before the icon manager receives notification of a change in attribute data. Another way to place a watch on a virtual network machine model is for the icon manager to set a timer to poll the model periodically. A watch is generic in that the data received from a watch includes a selected set of attribute data for the corresponding model. The data in a model may have changed extensively since the icon manager was last notified. When the icon manager polls a model, it reads attribute data from the model and performs required actions.

When the user clicks on an icon to proceed to another view, the icon manager determines the view class and the next view. The icon manager then issues a new view by passing the view class and the appropriate virtual network machine model ID to the view executive, thereby causing the current view to be destroyed.

The user interface 10 and the virtual network machine 12 communicate via Unix sockets. Messages between these two components are encoded in a machine independent format. A user interface object such as an icon manager or a view manager may communicate with a model, model type or model relation in the virtual network machine in order to retrieve attribute data. It is to be understood that alternative embodiments may utilize any of a variety of software communication methods and that the present invention is in no way limited to any particular operating system or any particular software communication protocol.

Figure 9:
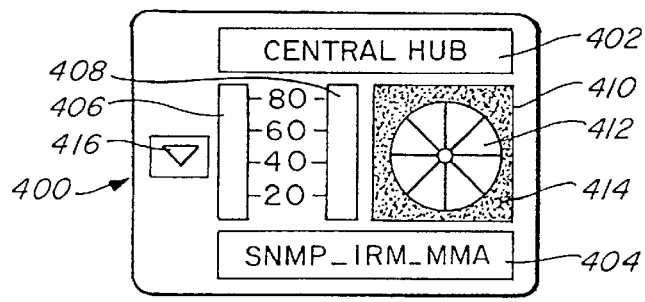
FIG. 9 is a schematic diagram of a multifunction icon employed in the user display views.

The multifunction icons used in the network management system provide a highly flexible technique for presenting information to the user. As shown in FIG. 9, a multifunction icon 400 can include an area 402 for a device name, an area 404 for model type information, bar graphs 406 and 408 for indicating performance parameters such as number of packets and error rate, an area 410 for displaying an iconic or symbolic representation 412 of the device, a background area 414 for representing the status of the network device by different colors and a FIG. 416 that is used for traversing to a pictorial representation of the device. Some or all of the areas of the icon can be clicked upon to obtain additional information regarding the network device.

In a preferred embodiment, a view showing general configuration information relating to the network device is provided when the user clicks on area 402 or 404 of icon 400. A view showing status information pertaining to the device is provided when the user clicks on area 410, and a view showing performance information is provided when the user clicks on bar graphs 406 and 408. As indicated above, a pictorial representation of the network device is provided when the user clicks on FIG. 416. It will be understood that the multifunction icon can include different information and areas, depending on the device being represented and the information that is required, and that different information and display views can be provided by clicking on different areas of the icon.

Figure 10:
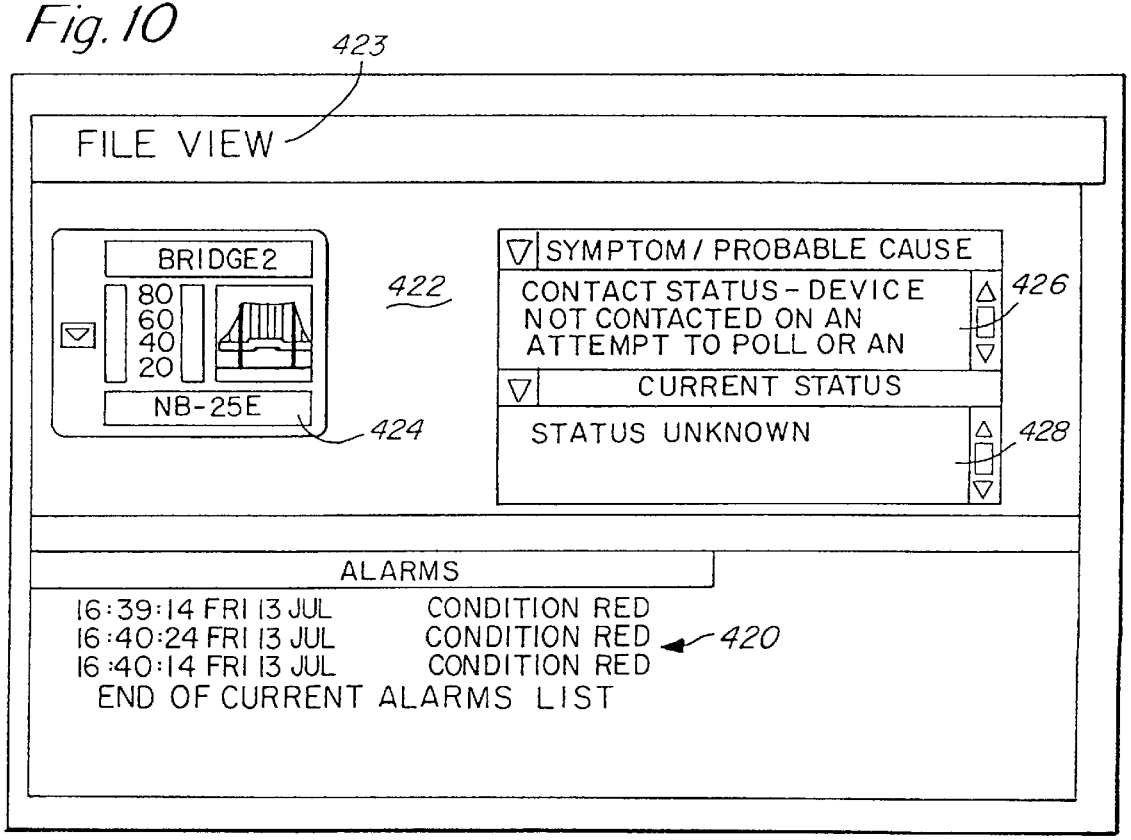
FIG. 10 shows an example of an alarm log display provided by the network management system.

The multifunction icons shown and described herein are used in an alarm log view that is shown in FIG. 10. The alarm log view includes an area 420 for listing of current alarms, an area 422 for display of information pertaining to a selected alarm and a button panel 432 which displays options available for an alarm. The user may click on a particular alarm in the listing of current alarms to obtain more information. A multifunction icon 424 representing the network device having a fault is displayed in area 422 with one or more text fields 426 and 428 which provide information to the user regarding the cause of the alarm and the status of the device. By clicking on specified areas of the icon 424, the user can obtain further information regarding the device for which an alarm is registered, as described above in connection with icon 400. The user can also traverse to the location or topological view from the alarm log view. By clicking on other alarms in the alarm list, similar information is obtained regarding other alarm conditions.

The user interface of the network management system is highly flexible and permits new views of the network to be added to the network management system. New views require new view managers and icon managers to be instantiated. Since the views are implemented as C++ objects, new views and icons are easily derived from existing views and icons. New views and modifications of existing views are easily provided by additions or changes to parameters and data which control the views, without changes to the control code.

Certain devices, such as coaxial ("coax") segments, connectors, buses, rings, fiber segments, wide area segments, multiplexers, etc., lack the built-in intelligence to communicate with the network management system in any manner. Other devices can communicate with the network management system, but only at tremendous cost to the network in terms of network performance. Yet, it is desirable for the network management system to obtain information concerning such devices. The present invention includes a model and methodology for inferring this information from other information received by the network management system.

Devices for which direct communication is impossible or impractical are represented in the network management system by inferred connector models. The inferred connector models construct information without polling the network entity. This is necessary because some network entities are non-pollable. For other entities, polling is technologically possible but is extremely costly in terms of its impact on network performance. The inferred connector models differ in some respects from the models described above. As used herein, the term "connector model" is not limited to models of network connectors, but includes a model of any network entity in which the information is inferred, as opposed to information obtained by direct communication with the entity. As indicated above, such network entities include coax segments, connectors, buses, rings, fiber segments, wide area segments, multiplexers, etc. Similarly, the term "connector" is used herein to refer to the above types of network entities. The present invention also includes a methodology wherein polling requests are substantially minimized. (How?)

The connector models preferably employ model-based intelligence and include inference handlers. By receiving selected information from the network management system, the connector models infer contact status as well as other information pertaining to the connectors within the network. Information as to the status of a connector (a non-communicating network entity) is inferred from relation or connection information as to the network entities that are related to the connector and operational information as to the status of those network entities that are related to the connector. The operational information is usually obtained by polling. The inferred information can be accessed or viewed via the user interface, or can trigger other routines within the network management system. By providing more particular information about the connectors within a network, the connector models allow the network management system to better diagnose network problems.

In general, the inference handlers of each connector model are triggered either when a device is connected to a modeled connector, or by a change in status for any entity that is connected to a modeled connector. A detailed description of the routines within the connector model is provided below.

It is useful to define certain terminology that relates to the connector models. Contact status is an attribute, i.e., data, within each of the models. The various states of contact status describe the capability of the corresponding network entity to perform on the network. When a device is "established", the network management system has determined that this device is capable of sending and receiving messages. This may be determined through a simple polling request. When a device is "lost", the network management system has determined that, at least for the moment, the device is unable to respond to polling requests. As described below, the inability to communicate can be the fault of the device itself or it can be the fault of the connector to which the device is connected. When a device is in an "initial" state, the network management system has not yet determined whether the device is established or lost. For example, when a device is first added to a network, a model is created for that device, and the attributes of the model are initialized. Among the attributes to be initialized is contact status, which receives a value of "initial" and remains in this state until a polling request has been sent to the device to determine otherwise.

From the perspective of the connector models, network devices are divided into two general categories: non-ported and ported. A personal computer (PC), for example, is a non-ported device. The contact status for the PC adequately describes the ability of the PC to communicate on the network. A hub is a ported device, and contact status by itself is inadequate for connector model purposes. Ported devices generally have many ports, e.g., a hub may have 100 ports. At any given instant, some of the ports may be inoperative, while the remainder continue to function. Contact status for the hub does not contain enough information to indicate the status of the hub ports. Consequently, besides having a contact status to describe the overall status of the ported device, each port within the ported device has an associated port link status. The status is determined by polling different information within the ported device. For example, the contact status is determined by polling information that relates to the hub itself, while port link status is determined by polling information particular to that port.

The connector model classifies ports into two types. First, there are repeater ports. Repeater ports are extremely common entities within a network. For instance, a network hub may have 100 repeater ports. The connector model, however, requires information from only a relatively few of the repeater ports. More specifically, the connector model requires information from only those repeater ports that are connected to a connector with a corresponding inferred connector model. It is therefore advantageous to limit polling requests to those repeater ports that are connected to modeled connectors. In a preferred embodiment, the connector models poll only those repeater ports that are connected to a modeled connector. Second, there are Internet Interface ports, which are far less common than repeater ports in a network system. In the preferred embodiment all Internet Interface ports are polled, as the relative infrequency of these ports does not warrant the extra complexity of optimizing software. It is understood, however, that the same technique applied to repeater port polling optimization can easily be applied to Internet Interface ports.

The Internet Interface port specific routines utilize names that reflect the terms used within the art. Specifically, admin_status and operational_status are attributes within the Management Information Base (MIB) of Internet Interface ports. The connector models utilize these names. Operational_status represents the actual status of the port. Admin_status represents the desired status of the port. It should be noted that individual ports can be turned off by the management system. When this is done, admin_status is "down"; admin_status or operational_status of "up" indicates that the port is operative.

In the descriptions below, the following naming convention applies. Routine names use capitals and an underscore to connect the words forming the name. Data names, or attributes, use lower case. For instance, "CHILD_COUNT" refers to the routine which determines data called "child_count". The actual software comprising the present invention can use a different naming methodology and/or different names.

Set forth below are descriptions of the preferred routines which constitute the connector model:

1. A CHILD_COUNT routine counts the number of models that are connected to the particular connector model. By doing so, the routine tracks the number of actual devices that are connected to the corresponding connector. Devices can be added and deleted during the life of the network. Thus, child_count is dynamic. When a device is either connected to or disconnected from the connector, the network management system should be updated via the user interface. When the network management system is updated, this routine is triggered so that child_count is changed accordingly.

2. An INITIAL_CHILD_COUNT routine counts the number of models that have a contact_status of "initial" and are connected to the particular connector. This routine has two basic triggering events. First, this routine is triggered when a device is connected to or disconnected from a particular connector, and determines whether the connecting or disconnecting device has a contact_status of "initial." If it does, initial_child_count is changed accordingly. Second, the INITIAL_CHILD_COUNT routine is triggered when a model that is already connected to the connector changes its contact_status. For instance, a model corresponding to a PC that is connected to a connector starts out with its contact_status as "initial." Some time later, after a polling request to the PC, the contact_status of the PC changes, for example, to "established." When this occurs, INITIAL_CHILD_COUNT is triggered, and initial_child_count is changed accordingly.

3. A LOST_CHILD_COUNT routine has a functionality that is identical to that for INITIAL_CHILD_COUNT with one difference. The difference is that LOST_CHILD_COUNT is concerned with a contact status of "lost" rather than "initial". When a device is connected to or disconnected from a connector, this routine determines whether the contact_status of that device is "lost". Likewise, for any devices that are already connected to this connector, the routine determines whether the contact_status of the device has changed to or from "lost".

4. A BAD_LINK_STATUS_COUNT routine is concerned with ported devices and the ports connected to a modeled connector. This routine counts the number of port models which have a port_link_status of "bad" and are connected to the modeled connector. The function of this routine is very similar to counting the lost_child_count for non-ported devices. However, connector models are concerned with the individual status of the ports rather than the overall contact_status of the ported device.

5. A REPEATER_PORT_LINK_STATUS routine determines the port_link_status for all repeater ports that are connected to an inferred connector model. This routine obviates the need for polling each repeater port in the ported device. It does so by watching certain polling control variables within the network management system. From this information, this routine determines when the ported device is to be polled. At the polling interval, this routine reads the total traffic object for only the connected repeater ports. The total traffic object is a data value that can be read from each repeater port and that indicates the volume of traffic through that port. If there is a change in the traffic count from the last polled value, this routine infers that the port_link_status is "good." If there is no change in the traffic count, this routine sets port_link_status to "bad." It should be noted that when contact_status is "lost" for the ported device itself, port_link_status for the individual ports is set to "unknown." This action is taken so that double counting does not occur when computing the number of operative devices or ports connected to a modeled connector. This is more fully described below in the discussion of COMPOSITE_BAD_COUNT.

6. An INTERFACE_INTERNAL_LINK_STATUS routine determines the port_link_status for Internet Interface ports that are connected to a modeled connector. This routine polls operational_status for those ports. When the operational_status is "down" and the admin_status is "up" after polling, this routine sets port_link_status to "bad"; otherwise port_link_status is set to "good". It should be noted that a port can be turned off by the management system. When this is done, admin_status is set to "down." It follows that for connector model purposes, when the desired status, i.e., admin status, is down for a particular port, an operational_status of down for that port should not be construed as the port being inoperative. For the reasons discussed above, when contact_status is "lost" for the ported device, port_link_status is set to "unknown."

7. A COMPOSITE_BAD_COUNT routine computes the sum of bad_link_status_count and lost_child_count for the particular connector model. When either bad_link_status_count or lost_child_count changes, COMPOSITE_BAD_COUNT is triggered and composite_bad_count is changed accordingly. Within the virtual network, both a ported device and an individual port within that device can be regarded as connected to the same modeled connector. Yet, in reality there is only one device connected to the connector. When the contact_status of the ported device changes to lost, LOST_CHILD_COUNT for that connector model is triggered. At the same time, the REPEATER_PORT_LINK_STATUS and INTERFACE_INTERNAL_LINK_STATUS routines discussed above change port_link_status to "unknown." This is done to prevent the port_link_status from being changed to bad and thereby prevents double counting. For example, when a hub has one of its ports corrected to a modeled connector, both the hub and the port have a model relationship indicating that they are connected to the connector. When the hub loses contact status, LOST_CHILD_COUNT for the connector is triggered and consequently COMPOSITE_BAD_COUNT is also triggered. In addition, it is highly likely that when the hub loses contact status all the ports will become "bad." If the previously discussed routines did not change the status to "unknown," a "bad" port status likewise triggers COMPOSITE_BAD_COUNT. The result is that, although in reality only one connection to the modeled connector has become inoperative, COMPOSITE_BAD_COUNT would indicate that two connections have become "bad".

8. A CONTACT_STATUS routine infers the contact_status of the particular connector model. The result of this routine is an inference of whether the actual connector being modeled is operational, i.e., established. The contact_status for the particular connector model is determined by the following formula:

```
If (( composite_bad_count GTR= (child_count − initial_
    child_count)) and (composite_bad_count GTR 0))
    contact_status = lost
else if (initial_child_count EQL child_count)
    contact_status = initial
else
    contact_status = established,
``` where "GTR=" means greater than or equal to, and "EQL" means equal to.

The formula makes the following inferences. First, if all entities connected to a connector are either "lost," known "bad," or "initial," the connector is inferred to be "lost." This inference is sound because, if the connector is "lost," this can account for all of the devices having their contact status as "lost" or their port_link_status as "bad." Second, if all the devices on the connector are still in an initial state, then the connector is best described as being in an initial state, i.e., it is not yet known whether the connector is properly connected. It should be noted that models do not remain in an "initial" state for very long. Contact_status changes from "initial." after the next polling interval. Polling intervals ordinarily occur on the order of every minute, but as previously stated the polling interval is programmable. Finally, if any device connected to the connector is "established", then the connector must be established, as there is no other way in which the device could have that contact_status.

The following examples illustrate the connector model in-operation.

Figure 11:
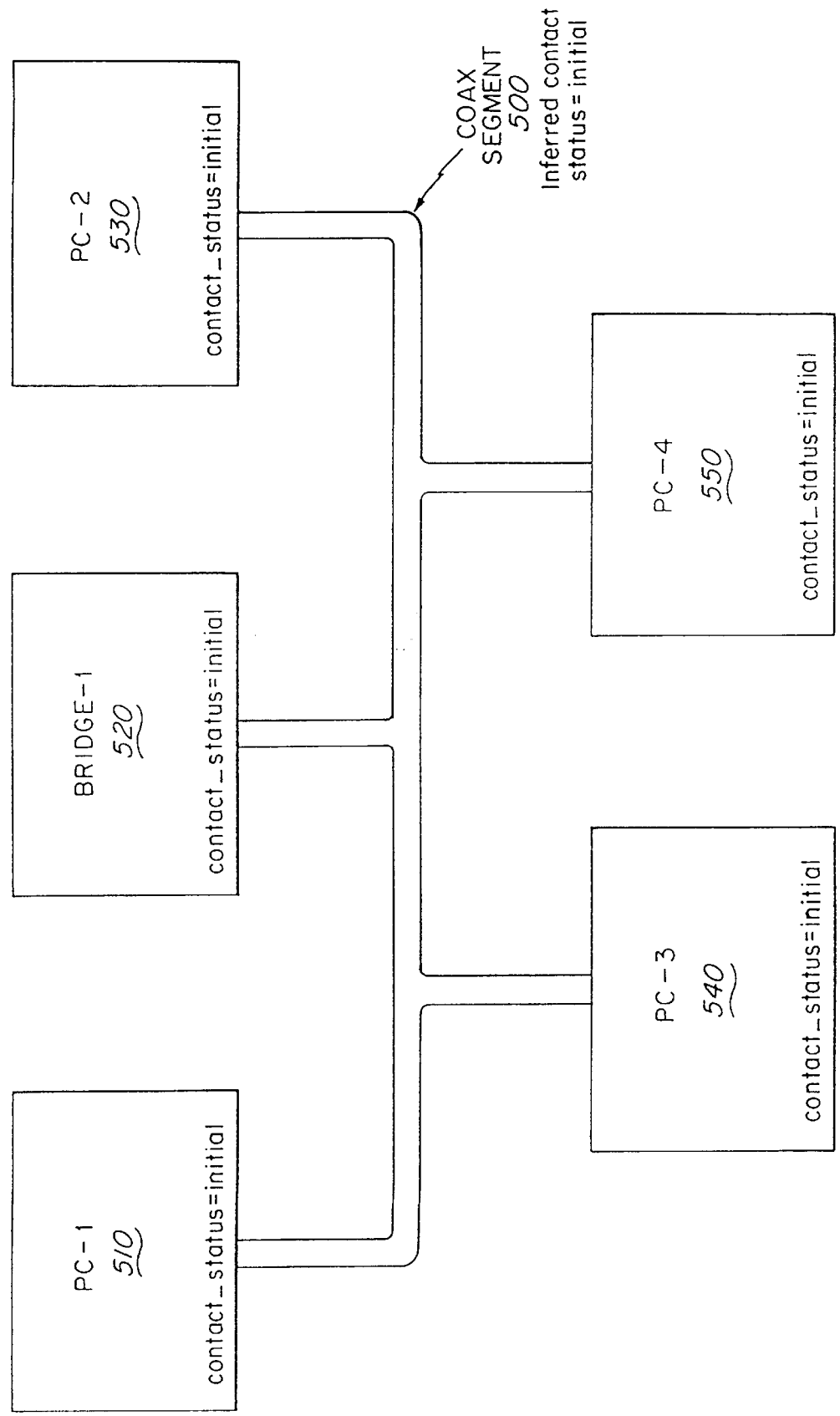
FIGS. 11–13 are block diagrams of a network which illustrate the operation of an inferred connector model of a coaxial segment.

Referring to FIG. 11, five pollable devices 510, 520, 530, 540, 550 (including four PC's and one bridge) are connected to a coax segment 500. Each of the pollable devices 510, 520, 530, 540, 550 has a corresponding model within the previously described virtual network. A model of the coax segment 500 is an inferred connector model. The model of each device has an attribute to reflect the current, or at least the last polled, contact status. Assume models of all five devices have a contact_status of "initial." The routines described above infer that the coax segment 500 has a contact status of "initial." Some time later, the devices will have performed some actual work. The network management system, likewise, will have polled these devices to determine their status.

Figure 12:
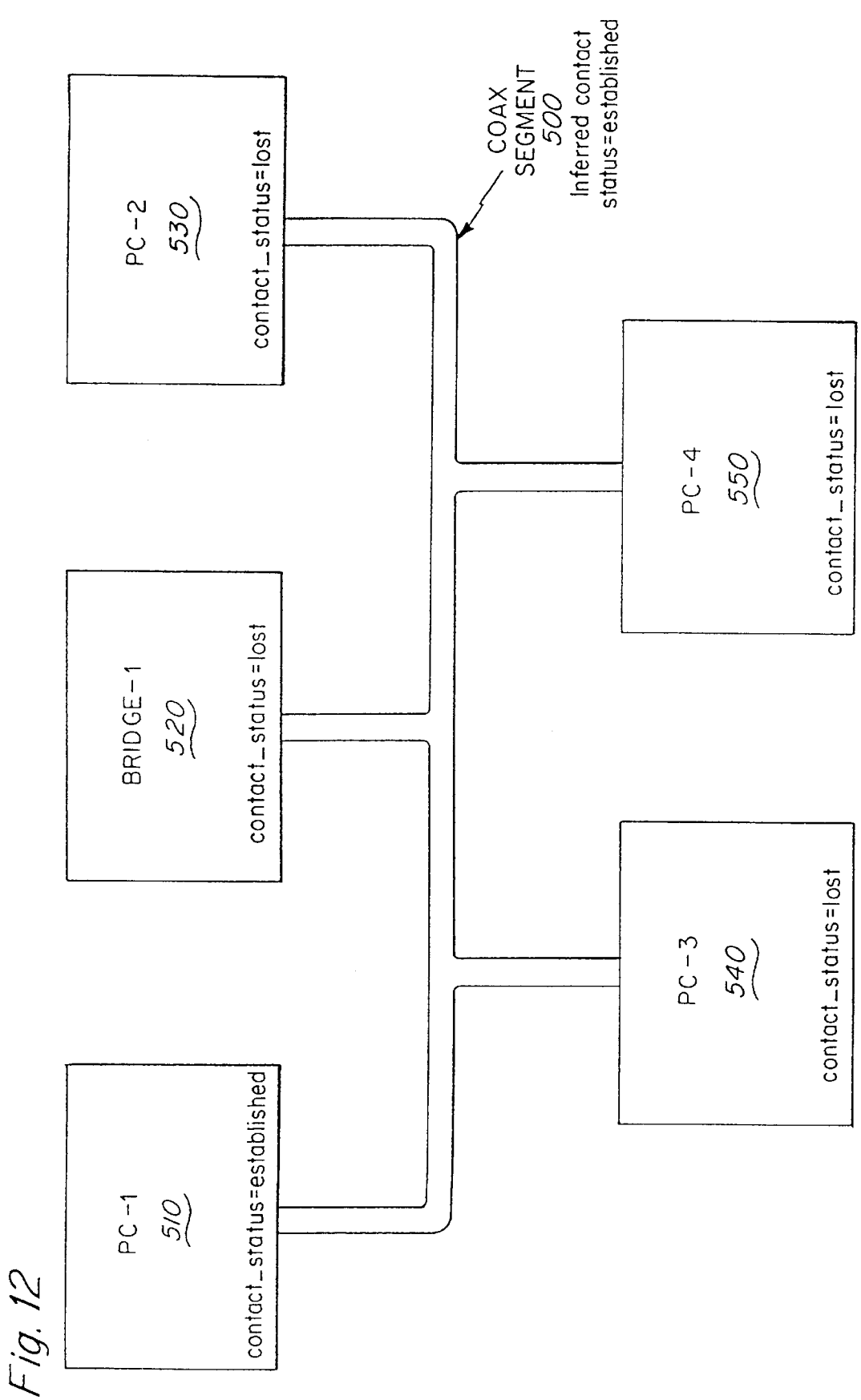

Referring to FIG. 12, the devices 520, 530, 540 and 550 connected to the coax segment 500 now have a contact_status of "lost"; the device 510 has a contact status of "established". Since it is impossible for the device 510 to have a contact_status of "established" without having a functioning coax segment to determine this, the coax segment 500 likewise must have an inferred contact status of "established." The contact_status of the device 510 is determined by polling requests that travel via the coax segment 500.

Figure 13:
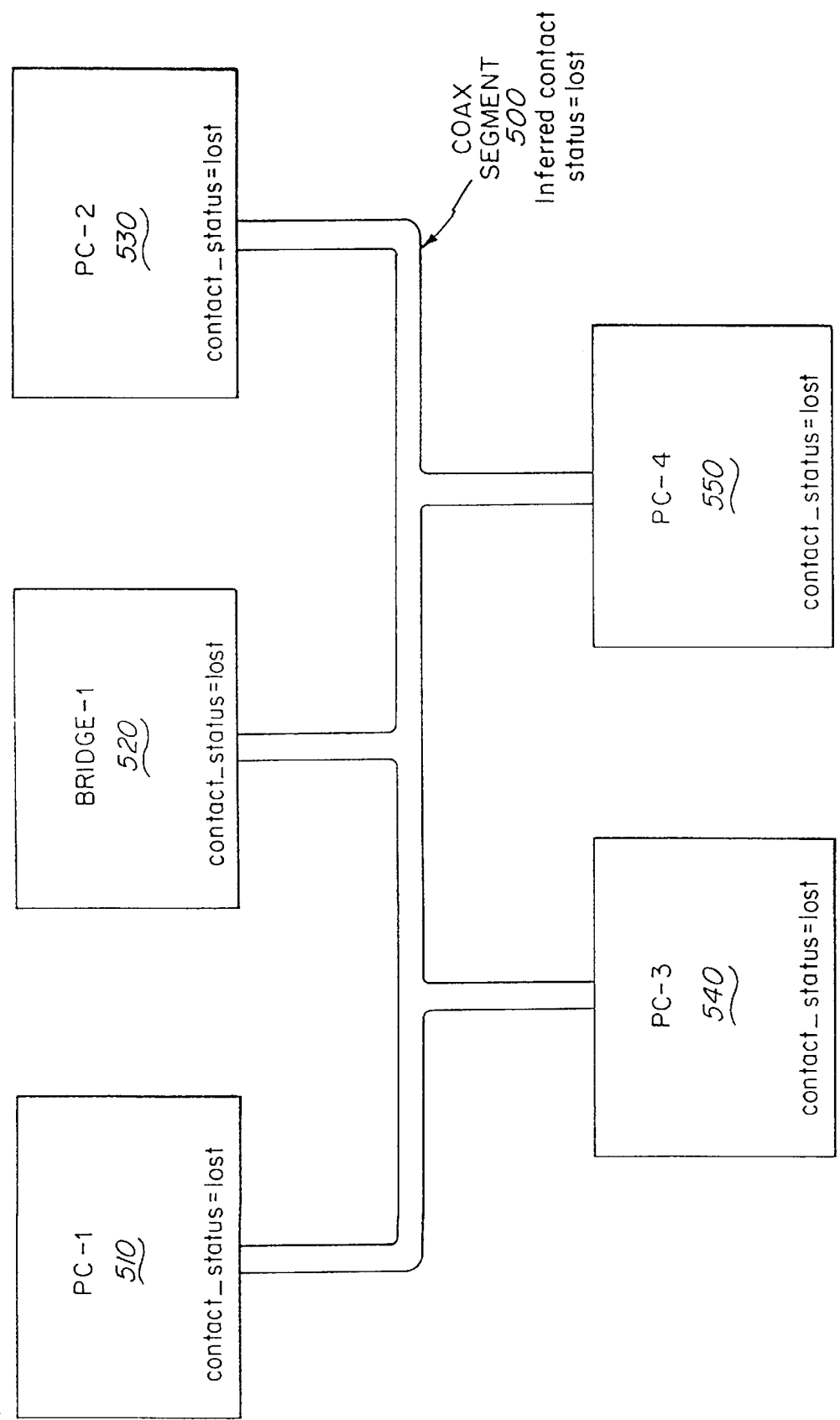

Now assume that at the next polling interval no response is received from PC 510. The current state of the network is illustrated in FIG. 13. When no response is received from PC 510, the following changes occur in the virtual network. Contact status within the model for PC 510 changes to "lost". This change triggers LOST_CHILD_COUNT in the model for the coax segment 500. LOST_CHILD_COUNT, accordingly, changes the data value lost_child_count. The change in lost_child_count triggers COMPOSITE_BAD_COUNT within the same model. COMPOSITE_BAD_COUNT changes the data value composite_bad_count accordingly. The change in composite_bad_count triggers CONTACT_STATUS within the same model. Finally, the contact_status for the coax segment 500 changes to "lost," as all the devices connected to that coax segment are now lost. This change in contact_status can then be sent to the network management system where it is likely to be immediately relayed to the video display as an alarm. It should be noted that the coax segment 500 is not necessarily defective. However, an intelligent inference, made by the connector models, reasons that all five devices 510, 520, 530, 540, 550 have a contact_status of "lost" because the coax segment 500 connecting them together is "lost." It is more probable that the coax segment 500 is a single point of failure than that five devices have independently and concurrently become inoperable.

It should be noted that the inferred connector models described herein are not limited to use in the network management system described above. The connector model can operate with any network management system that is capable of supplying the required information to it. The network management system must be capable of providing information when new devices are added to or deleted from the connector and when the status of any connected device changes.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In a network comprising interrelated network entities including communicating network entities and at least one non-communicating network entity, a method for monitoring a status of the non-communicating network entity, comprising the steps of:

providing an electronic network management system;
   said network management system communicating with
      said communicating network entities to obtain operational information as to the communicating network entities; and said network management system using the operational information as to the communicating network entities and information as to relations between said non-communicating network entity and said communicating network entities to infer the status of the non-communicating network entity.

2. A method as defined in claim 1 wherein the step of communicating with said communicating network entities includes said network management system polling said network entities at predetermined intervals.

3. A method as defined in claim 1 wherein the step of providing an electronic network management system includes the step of maintaining in the network management system a representation of the network including models and relations between models, said models including models of said communicating network entities and inferred models of said non-communicating network entity, each model including one or more inference handlers, said inference handlers in said inferred models updating status information in response to information obtained from the models of said communicating network entities.

4. A method as defined in claim 1 further including the step of providing the status of the non-communicating network entity to a user.

5. A method as defined in claim 1 wherein the step of inferring the status of the non-communicating network entity includes inferring a lost contact status when all network entities connected to the non-communicating network entity have a lost contact status.

6. A method as defined in claim 1 wherein the step of inferring the status of the non-communicating network entity includes inferring an established contact status when at least one network entity connected to the non-communicating network entity has an established contact status.

7. A method as defined in claim 1 wherein the step of inferring the status of the non-communicating entity includes inferring an initial contact status when all network entities connected to the non-communicating network entity have an initial contact status.

8. A method as defined in claim 1 further including the step of updating the information as to relations between said non-communicating network entity and said communicating network entities when a network entity is added to or removed from said network.

9. A method as defined in claim 1 wherein the step of obtaining operational information as to the communicating network entities includes periodically updating a contact status of said communicating network entities.

10. A method as defined in claim 1 wherein the step of obtaining operational information as to the communicating network entities includes updating a contact status of ports in a ported network entity.

* * * * *